United States Patent
Filip et al.

(10) Patent No.: US 11,995,047 B2
(45) Date of Patent: May 28, 2024

(54) DYNAMIC SCHEMA BASED MULTITENANCY

(71) Applicant: INTERNATIONAL BUSINESS MACHINES CORPORATION, Armonk, NY (US)

(72) Inventors: Marcin Filip, Cracow (PL); Michal Bodziony, Tegoborze (PL); Marcin Luczynski, Cracow (PL); Andrzej Laskawiec, Cracow (PL); Lukasz Stanislaw Studzienny, Cracow (PL); Monika Piatek, Cracow (PL); Tomasz Zatorski, Krarkow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 515 days.

(21) Appl. No.: 16/846,078

(22) Filed: Apr. 10, 2020

(65) Prior Publication Data
US 2021/0318998 A1 Oct. 14, 2021

(51) Int. Cl.
*G06F 16/21* (2019.01)
*G06F 16/245* (2019.01)
(Continued)

(52) U.S. Cl.
CPC .......... *G06F 16/213* (2019.01); *G06F 16/245* (2019.01); *G06F 16/27* (2019.01); *G06F 16/289* (2019.01); *G06F 21/6227* (2013.01)

(58) Field of Classification Search
CPC ...... G06F 16/213; G06F 16/245; G06F 16/27; G06F 16/289
See application file for complete search history.

(56) References Cited

U.S. PATENT DOCUMENTS 5,987,468 A * 11/1999 Singh ................... G06F 16/2246
6,044,224 A * 3/2000 Radia ..................... G06F 9/465
719/331

(Continued)

FOREIGN PATENT DOCUMENTS

CN 109947773 A * 6/2019 ............ G06F 16/211
EP 2085880 A2 * 8/2009 ........... G06F 9/4433
(Continued)

OTHER PUBLICATIONS

Ziani, Configuration in ERP SaaS Multi-Tenancy (May 4, 2014) (Year: 2014).*

(Continued)

*Primary Examiner* — Neveen Abel Jalil
*Assistant Examiner* — Hubert Cheung
(74) *Attorney, Agent, or Firm* — Lily Neff; George S. Blasiak; Heslin Rothenberg Farley & Mesiti PC

(57) ABSTRACT

Methods, computer program products, and systems are presented. The method computer program products, and systems can include, for instance: running an application on one or more computing node, the application providing user access to a database; receiving by the application registration data from a user for registering the user into a service; in response to the receiving the registration data from the user, generating a user schema that defines access rights of the user to the database, wherein the generated user schema includes a set of shared data structure objects instantiated in a storage system associated to the application, and a set of private data structure objects.

20 Claims, 8 Drawing Sheets

(51) Int. Cl.
*G06F 16/27* (2019.01)
*G06F 16/28* (2019.01)
*G06F 21/62* (2013.01)

(56) References Cited

U.S. PATENT DOCUMENTS

| | | | | |
|---|---|---|---|---|
| 6,205,465 | B1* | 3/2001 | Schoening | G06F 9/4843 |
| | | | | 718/102 |
| 6,769,124 | B1* | 7/2004 | Schoening | G06F 9/4493 |
| | | | | 707/999.102 |
| 7,092,973 | B2* | 8/2006 | Muehl | G06F 16/27 |
| | | | | 707/999.203 |
| 7,139,768 | B1* | 11/2006 | Janzig | G06F 16/168 |
| | | | | 707/999.102 |
| 7,779,039 | B2 | 8/2010 | Weissman et al. | |
| 8,930,413 | B2* | 1/2015 | Tang | G06F 16/211 |
| | | | | 707/812 |
| 10,860,550 | B1* | 12/2020 | Chheda | G06F 16/213 |
| 11,061,897 | B2* | 7/2021 | Zimmermann | G06F 16/2282 |
| 11,080,423 | B1* | 8/2021 | Kassam-Adams | G16H 15/00 |
| 2003/0115268 | A1* | 6/2003 | Esposito | G06F 16/2365 |
| | | | | 709/205 |
| 2005/0120061 | A1* | 6/2005 | Kraft | G06F 16/275 |
| | | | | 707/999.203 |
| 2006/0106827 | A1* | 5/2006 | Brown | G06F 16/10 |
| 2006/0136443 | A1* | 6/2006 | Dulay | G06F 16/275 |
| 2008/0288510 | A1* | 11/2008 | Bloesch | G06F 16/20 |
| 2011/0113072 | A1* | 5/2011 | Lee | G06F 16/245 |
| | | | | 707/802 |
| 2012/0072465 | A1* | 3/2012 | McGowan | G06F 16/21 |
| | | | | 707/E17.055 |
| 2012/0131038 | A1* | 5/2012 | Aronovich | H04L 67/1097 |
| | | | | 707/769 |
| 2013/0086322 | A1 | 4/2013 | Pelletier et al. | |
| 2013/0173669 | A1* | 7/2013 | Tang | G06F 16/211 |
| | | | | 707/E17.044 |
| 2016/0308968 | A1* | 10/2016 | Friedman | G06F 12/0813 |
| 2017/0123935 | A1* | 5/2017 | Pandit | G06F 16/2219 |
| 2019/0138608 | A1* | 5/2019 | Schundelmeier | G06Q 30/06 |
| 2020/0293550 | A1* | 9/2020 | Acheson | G06F 16/273 |
| 2021/0173641 | A1* | 6/2021 | Dolby | G06N 5/02 |
| 2023/0385260 | A1* | 11/2023 | Sasson | G06F 11/1448 |

FOREIGN PATENT DOCUMENTS

| | | | | |
|---|---|---|---|---|
| JP | 2015513153 A | * | 4/2015 | |
| JP | 2018114206 A | * | 7/2018 | |
| WO | WO-0221451 A1 | * | 3/2002 | G06F 9/54 |
| WO | WO-2004008348 A1 | * | 1/2004 | G06F 17/3002 |
| WO | WO-2013139000 A1 | * | 9/2013 | G06F 8/20 |

OTHER PUBLICATIONS

Shahid, et al., "Object-Relational Mapping Framework to Enable Multi-Tenancy Attributes in SaaS Applications", International Journal of Cloud Computing and Services Science (IJ-Closer) vol. 2, No. 1, Feb. 2013, pp. 65-72.

Liao, et al. "A Service Framework for Multi-tenant Enterprise Application in SaaS Environments", Proceedings of the 9$^{th}$ International Conference on Software Engineering and Applications (ICSOFT-EA-2014), pp. 5-13.

Mell, et al. *"The NIST Definition of Cloud Computing"*, NIST Special Publication 800-145, Sep. 2011, Gaithersburg, MD, 7 pgs.

\* cited by examiner

DYNAMIC SCHEMA BASED MULTITENANCY

BACKGROUND

Embodiments herein relate generally to databases and specifically to schema for databases.

Databases can be defined by an organized collection of data accessed electronically from a computer system. Databases can have associated Database Management Systems (DBMS). Database data can be organized in a series of tables having rows and columns of data. Database tables, in turn, can include one or more index. An index can be provided by a data structure that improves access to a database table.

Structured Query Language (SQL) is a domain specific language used in programming data management in a Database Management System (DBMS). SQL statements can be used for the performance of various database operations, such as INSERT, UPDATE, SELECT, and DELETE query operations. INSERT operations can be used for performance of input of a record into a database table, SELECT operations can be used to retrieve data from a database table, UPDATE operations can be used for changing a value within a database table, and DELETE operations can be used for removal of data from a database table.

Data structures have been employed for improving operation of a computer system. A data structure refers to an organization of data in a computer environment for improved computer system operation. Data structure types include containers, lists, stacks, queues, tables, and graphs. Data structures have been employed for improved computer system operation e.g. in terms of algorithm efficiency, memory usage efficiency, maintainability, and reliability.

Artificial intelligence (AI) refers to intelligence exhibited by machines. AI research includes search and mathematical optimization, neural networks, and probability. AI solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: generating a user schema that defines access rights of the user to a database, wherein the user schema resulting from the generating includes a set of shared data structure objects instantiated in a storage system associated to an application and a set of private data structure objects; determining that a query invoked by the user on the database is a query for modification of a certain data structure object that has a current status of shared according to the user schema; and in response to the determining that the query invoked by the user on the database is a query for modification of a certain data structure object that has a current status of shared according to the user schema, updating the user schema, wherein the updating the user schema includes replicating the certain data structure object from the set of shared data structure objects into the set of private data structure objects so that the certain data structure object is provided as a storage system instantiated data structure object of the set of private data structure objects, wherein the replicating is performed so that the certain data structure object remains as a storage system instantiated data structure object of the set of shared data structure objects.

Shortcomings of the prior art are overcome, and additional advantages are provided, through the provision, in one aspect, of a method. The method can include, for example: running an application on one or more computing node, the application providing user access to a database; receiving, by the application, registration data from a user for registering the user into a service; in response to the receiving the registration data from the user, generating a user schema that defines access rights of the user to the database, wherein the generated user schema includes a set of shared data structure objects instantiated in a storage system associated to the application, and a set of private data structure objects; determining that a query invoked by the user on the database is a query for modification of certain data structure object that has a current status of shared according to the user schema; and in response to the determining that the query invoked by the user on the database is a query for modification of a certain data structure object that has a current status of shared according to the user schema, updating the user schema, wherein the updating the user schema includes replicating the certain data structure object from the set of shared data structure objects into the set of private data structure objects so that the certain data structure object is provided as a storage system instantiated data structure object of the set of private data structure objects.

In another aspect, a computer program product can be provided. The computer program product can include a computer readable storage medium readable by one or more processing circuit and storing instructions for execution by one or more processor for performing a method. The method can include, for example: running an application on one or more computing node, the application providing user access to a database; receiving, by the application, registration data from a user for registering the user into a service; in response to the receiving the registration data from the user, generating a user schema that defines access rights of the user to the database, wherein the generated user schema includes a set of shared data structure objects instantiated in a storage system associated to the application, and a set of private data structure objects; determining that a query invoked by the user on the database is a query for modification of certain data structure object that has a current status of shared according to the user schema; and in response to the determining that the query invoked by the user on the database is a query for modification of a certain data structure object that has a current status of shared according to the user schema, updating the user schema, wherein the updating the user schema includes replicating the certain data structure object from the set of shared data structure objects into the set of private data structure objects so that the certain data structure object is provided as a storage system instantiated data structure object of the set of private data structure objects.

In a further aspect, a system can be provided. The system can include, for example, a memory. In addition, the system can include one or more processor in communication with the memory. Further, the system can include program instructions executable by the one or more processor via the memory to perform a method. The method can include, for example: running an application on one or more computing node, the application providing user access to a database; receiving, by the application, registration data from a user for registering the user into a service; in response to the receiving the registration data from the user, generating a user schema that defines access rights of the user to the database, wherein the generated user schema includes a set of shared data structure objects instantiated in a storage system associated to the application, and a set of private data structure objects; determining that a query invoked by the user on the database is a query for modification of certain data structure object that has a current status of shared according to the user schema; and in response to the determining that the query invoked by the user on the database is a query for modification of a certain data structure object that has a current status of shared according to the user schema, updating the user schema, wherein the updating the user schema includes replicating the certain data structure object from the set of shared data structure objects into the set of private data structure objects so that the certain data structure object is provided as a storage system instantiated data structure object of the set of private data structure objects.

Shortcomings of the prior art are overcome, and additional advantages are provided, through the provision, in one aspect, of a method. The method can include, for example: running an application on one or more computing node, the application providing user access to a database; receiving, by the application, registration data from a user for registering the user into a service; generating a user schema that defines access rights of the user to the database, wherein the user schema resulting from the generating includes a set of shared data structure objects instantiated in a storage system associated to the application, and a set of private data structure objects; determining that a query invoked by the user on the database satisfies a condition; and in response to the determining that the query invoked by the user on the database satisfies the condition, updating the user schema.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other data structure objects, features, and advantages of the invention are apparent from the following detailed description taken in conjunction with the accompanying drawings in which:

DETAILED DESCRIPTION

Figure 1:
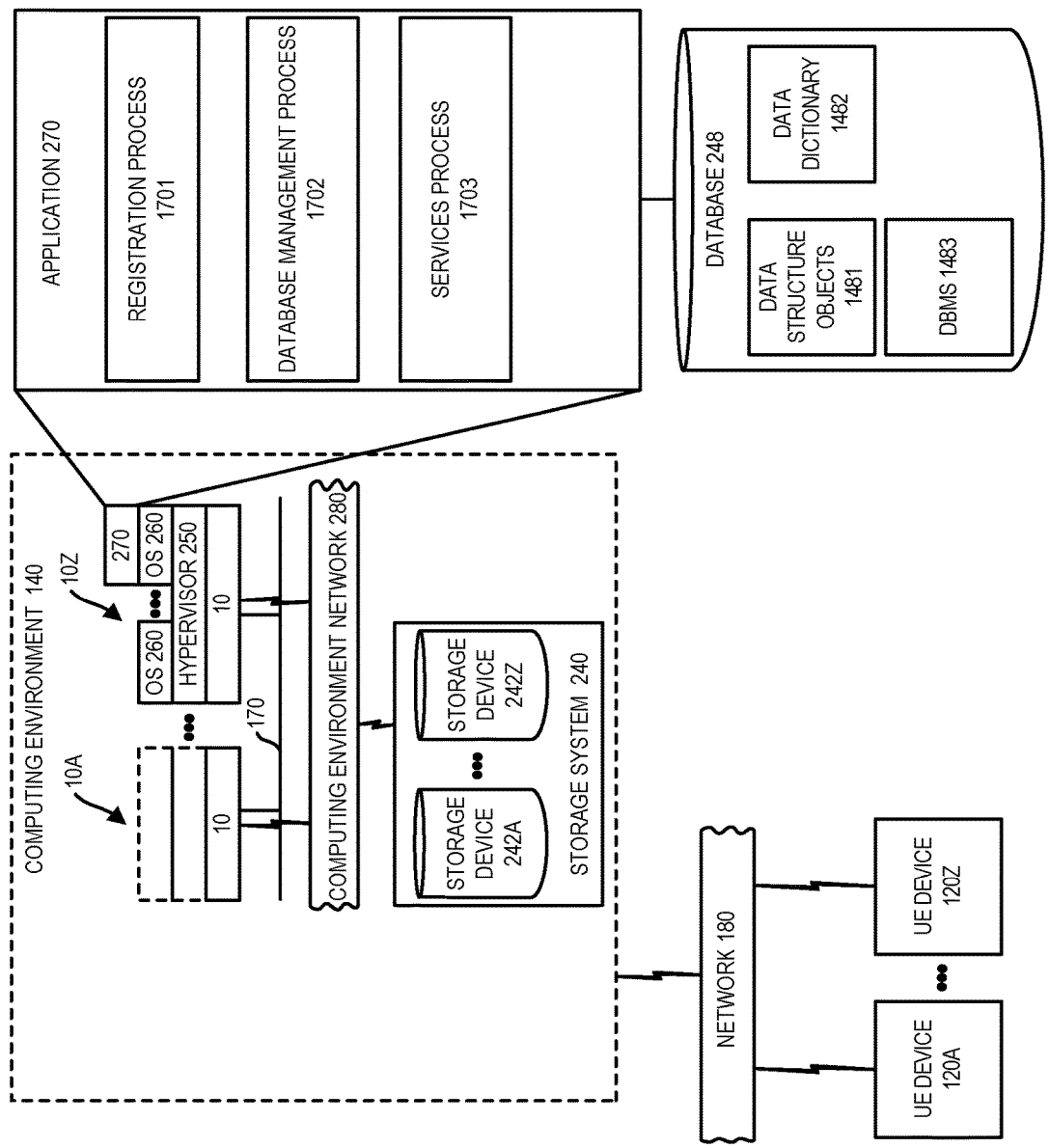
FIG. 1 depicts a system having a computing environment that hosts a database and a plurality of user equipment devices according to one embodiment.

System 100 for providing database multitenancy is illustrated in FIG. 1. System 100 can include computing environment 140, hosting application 270 for providing access to database 248, and user equipment (UE) devices 120A-120Z. UE devices 120A-120Z can be in communication with computing environment 140 via network 180. Network 180 can be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

System 100 can employ a schema based multitenancy architecture for defining access rights of users to database 248 stored in storage system 240 of computing environment 140. Embodiments herein recognize that existing schema based multitenancy architectures can include requirements for extensive replications of database data structure objects which can consume computing resources including processing availability or processor and storage as made available by storage system 240. For reduced consumption of computing resources, embodiments herein provide dynamic schema for a user defining access rights of a user to database data structure objects. Embodiments herein recognize that there is a common scenario where users register for service and perform no further interactions or essentially no further interactions with the database after an initial registration and enrollment. Embodiments herein provide for reduced consumption of computing resources in all scenarios including the described common scenario of users who are inactive after initial registration.

Each of the different UE devices 120A-120Z can be associated to a different user. Regarding one or more client computer device 120A-120Z, a computer device of one or more UE device 120A-120Z, in one embodiment, can be a computing node device provided by a client computer, e.g., a mobile device, a smartphone or tablet, a laptop, smartwatch or personal computer that runs one or more program, e.g., a web browser for opening and viewing web pages.

Computing environment 140 can include a plurality of computing nodes 10, which can be provided by physical computing nodes. The respective computing nodes 10 can have software running thereon defining computing node stacks 10A-10Z. Software defining the respective instances of computing node stacks 10A-10Z can be differentiated between the computing node stacks, e.g. some stacks can provide traditional bare metal machine operation, other stacks can include a hypervisor that supports a plurality of guest operating systems (OS) defining respective guest hypervisor based virtual machines (VMs), other stacks can include container based VMs, e g running on top of a hypervisor based VM or running on a computing node stack that is absent of a hypervisor. A plurality of different configurations are possible.

Computing environment 140, in addition to having computing node stacks 10A-10Z, can include a manager that runs an availability management process. The manager running an availability management process can adjust a hosting configuration for a given application to achieve a specified Service Level Agreement (SLA) requirement. The manager running an availability management process can adjust an availability rating for a given application, e.g., by migrating the application to a different computing node stack of computing environment 140, adding instances of the application, and/or subtracting instances of application.

Referring to further aspects of computing environment 140, computing environment 140 can include storage system 240. Storage system 240 can include storage devices 242A-242Z, which can be provided by physical storage devices. Physical storage devices of storage system 240 can include associated controllers. Storage devices 242A-242Z can be provided, e.g., by hard disks and Solid-State Storage Devices (SSDs). Storage system 240 can be in communication with computing node stacks 10A-10Z by way of a Storage Area Network (SAN) and/or a Network Attached Storage (NAS) link. Storage system 240 can be a shared storage system that is associated to application 270 for storing database 248 and to a plurality of additional nodes and applications. Storage system 240, in one embodiment, can be a dedicated storage system associated to application 270 for storing database 248.

According to one embodiment, computing environment 140 can include fibre channel network 170 providing communication between respective computing node stacks 10A-10Z and storage system 240. Fibre channel network 170 can include a physical fibre channel that runs the fibre channel protocol to define a SAN. NAS access to storage system 240 can be provided by computing environment network 280, which can be an IP based network. A computing environment manager can be in communication with computing node stacks 10A-10Z, by way of computing environment network 280.

Computing environment 140 can be configured to provide cloud computing services. Computing environment 140 can be provided, e.g., by one or more data center. Application 270 is shown as being hosted by computing node stack 10Z having a particular hosting configuration for illustrative purposes. However, it is understood that application 270 can be migrated to a different computing node stack or that the particular provisioning of computing node stack 10Z can be dynamically changed and further instances of application 270 can be increased or decreased. In the particular computing node stack 10Z, application 270 runs on a guest OS 260 defining a hypervisor based VM. The hypervisor based VM can run on hypervisor 250, and hypervisor 250 in turn can runs on computing node 10. Computing node 10 can be provided by physical computing node.

Application 270 can run various processes including registration process 1701, database management process 1702, and services process 1703. Application 270 running registration process 1701 can facilitate registration and enrollment of users as registered users of system 100 and database 248.

Application 270 running database management process 1702 can perform various functions. The various functions can include e.g. data storage, retrieval, and updating a data dictionary which data dictionary can describe and specifying schema for access of database data structure objects. Application 270 running database management process 1702 can further perform such functions as supporting transactions and concurrency, facilitating database recovery operations, enforcing constraints, supporting analysis utilities, and supporting interactions within application interface (API).

Application 270 running services process 1703 can adapt application 270 for a particular service, e.g., online trip reservation service, subscription service, banking or other financial service, retail service, membership service, benefits service, insurance service, social media service, and the like. Services process 1703 can, for example, process incoming user defined data and identify user invoked database queries based on the user defined data. Services process 1703 can further, e.g., adapt returned output data into a user accessible form. Returned output data can be output into a user interface of a UE device of UE devices 120A-120Z.

Database 248 can include, e.g., data structure objects 1481, data dictionary 1482, and DBMS 1483. Data structure objects 1481 can include, e.g., tables, indexes, sequences, and views. Data dictionary 1482 can define various schema such as including user schema. A schema can include a collection of logical structures of data or schema data structure objects. A certain user's schema can be owned by the certain user to define the certain user's access rights to data in database 248 and, according to one embodiment, can have a name in common with the name of the certain user. A user schema of a certain user as specified in data dictionary 1482 can specify that certain user's ownership and access rights to data structure objects of data structure objects 1481 within database 248.

Database 248 can include database management system (DBMS) 1483. DBMS 1483 can run database management process 1702 to provide the functions set forth in reference to database management process 1702. According to a schema based multitenancy architecture, respective users of a database can have associated thereto respective database schema. In a schema based multitenancy architecture, isolation between users can be achieved by the providing each user an individually owned schema. Embodiments herein recognize isolation advantages associated with a schema based multitenancy architecture but also recognize limitations with implementations of schema based multitenancy architectures. Embodiments herein recognize that implementation of schema based multitenancy architectures can result in excessive computing resources consumption. Embodiments herein recognize that a schema based multitenancy architecture can result in replication of database data structure objects with the onboarding of new users that exceeds predefined limits of available database software support packages. Embodiments herein recognize that a schema based multitenancy architecture, in the case of multiple onboarding events where new users are onboarded, can result in a storage capacity of storage system 240 being exceeded.

Database 248 described in logical form in connection with data structure objects 1481, data dictionary 1482, and DBMS 1483 can be stored within storage system 240 of computing environment 140 or can be distributed amongst storage systems of a plurality of computing environments 140. Embodiments herein recognize that existing schema based multitenancy architectures can include requirements for extensive replications of database data structure objects which can consume computing resources including processing availability or processor and storage as made available by storage system 240. For reduced consumption of computing resources, embodiments herein provide dynamic schema for a user defining access rights of a user to database data structure objects. Database management process 1702 can dynamically update a user's schema during the course of deployment of database 248.

Embodiments herein can include, on receiving registration data from a certain user, assigning to the certain user a user schema that defines ownership and access rights to (a) a plurality of shared data structure objects that are shared by users of system 100 other than the certain user and (b) zero or more storage system instantiated private data structure objects that are accessible selectively and only by the certain user.

Through the course of deployment of a database 248, database management process 1702 run by DBMS 1483 can update any certain user's assigned schema in dependence on database queries invoked by the certain user. According to one embodiment, system 100 can be configured so that for support of updating of a certain user's schema in dependence on a user invoked query, database management process 1702 can replicate a data structure object from the shared data structure objects having a data structure object name value associated to the query for inclusion as a storage system instantiated private data structure object of a private data structure object set of the certain user. According to the updated schema of the certain user, access to data of a data structure object having a name value according to the replicated data structure object, subsequent to the schema update, can be through the replicated storage system instantiated data structure object made part of storage system instantiated data structure objects of the certain user's set of private data structure objects.

There is set forth herein, according to one embodiment, running application 270 on one or more computing node, the application providing user access to a database; receiving, by the application 270, registration data from the user for registering the user into a service; in response to the receiving the registration data, assigning a user schema that defines access rights of the user to the database, wherein the user schema includes set of shared data structure objects and set of private data structure objects; determining that a query invoked by the user on the database is a query for modification of certain data structure object that has a current status of shared according to the user's schema; and in response to the determining that the query invoked by the user on the database is a query for modification of certain data structure object that has a current status of shared according to the user's schema, updating the user's schema, wherein the updating the user's schema includes replicating the certain data structure object from the set of shared data structure objects into the set of private data structure objects.

Figure 2A:
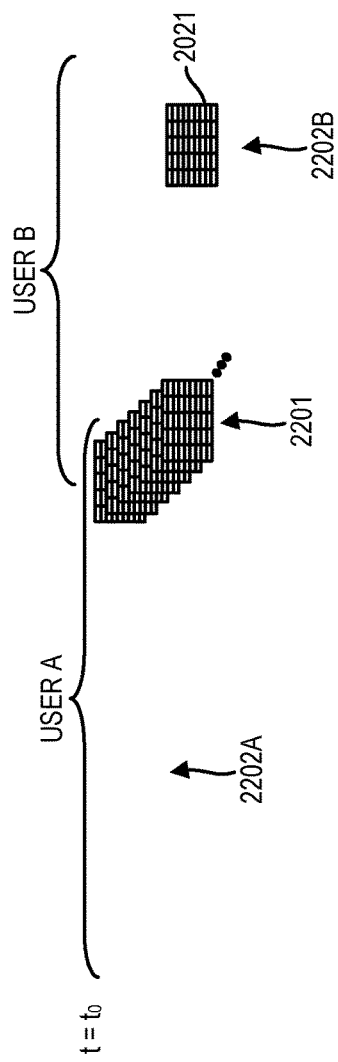
FIGS. 2A-2C are diagrams depicting assignments and updates of schema according to one embodiment.
Figure 2B:
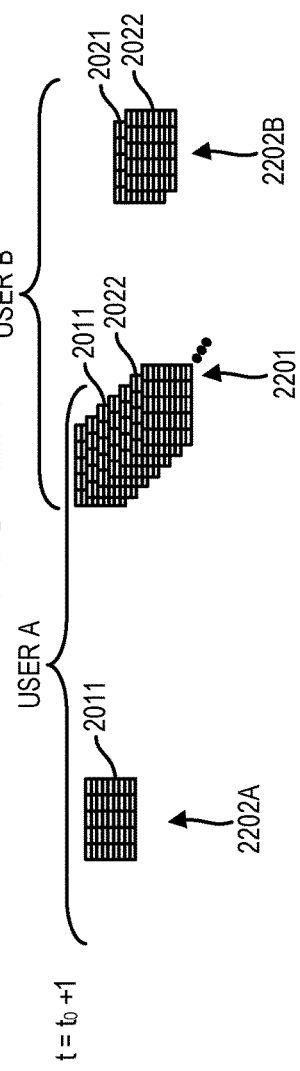
Figure 2C:
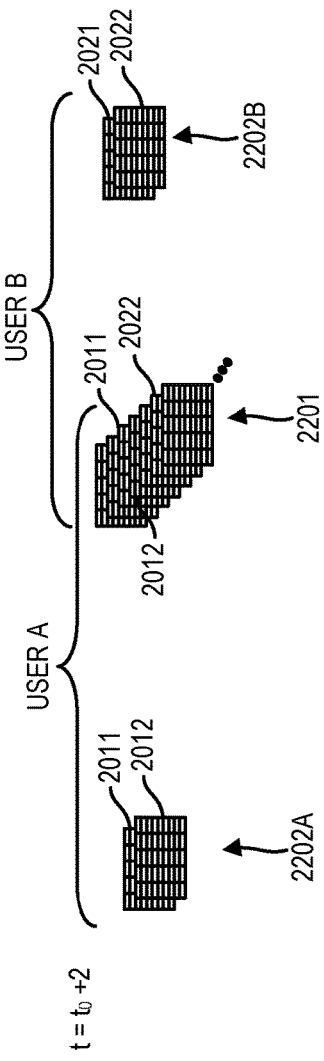

Further description of user's schema management by database management process 1702 is described in reference to FIGS. 2A-2C. FIG. 2A illustrates assigned user schema of first and second users, A and B, at time $t_0$. FIG. 2B illustrates assigned user schema at time $t_0+1$ for a first user and a second user, A and B, and FIG. 2C illustrates assigned schema for first and second users, A and B, at time $t=t_0+2$.

Referring to FIG. 2A, FIG. 2A can refer to the situation where user A and user B are registered and enrolled at a common time, and time $t_0$ illustrates a time of registration and enrollment for a first user, user A, and a second user, user B. At a time of registration and enrollment, database management process 1702, on registration of a user, can assign respective user's schema to user A and user B, respectively. The assigned schema assigned to the first user and the second user can define access rights to data structure objects of set of shared data structure objects 2201 instantiated in storage system 240 that are shared amongst a plurality of users of database 248 and can define access rights to set of private data structure objects comprising zero or more storage system instantiated private data structure objects that are selectively accessible by the one user to whom the schema pertains.

Referring to FIG. 2A, database management process 1702 at time $t=t_0$ can assign for the first user, user A, a schema defining access rights for the first user to data structure objects of set of shared data structure objects 2201 instantiated in storage system 240 and access rights to zero storage system instantiated data structure objects that are included in set of private data structure objects 2202A at time $t_0$. The assigned schema for the second user, user B, can define for the second user, user B, access to data structure objects of set of shared data structure objects 2201 and access to one data structure object of set of private data structure objects 2202B associated to the second user. The data structure objects of set of shared data structure objects 2201 instantiated in storage system 240 can include, e.g., a plurality of tables. The plurality of shared data structure objects, e.g., plurality of shared tables, can be shared amongst a plurality of users, e.g., user A, user B, as well as one or more additional users of system 100 and database 248. The shared data structure objects, e.g., shared tables, can be shared amongst users by way of their being made accessible to a plurality of users in accordance with assigned schema assigned to the respective users of the plurality of users.

The set of private data structure objects 2202A associated to the assigned schema for user A at time $t=t_0$ can include the described example zero storage system instantiated data structure objects that consume storage locations of storage system 240. The assigned set of private data structure objects 2202B assigned to user B at time $t=t_0$ in the described example of FIG. 2A can include, e.g., a single storage system instantiated data structure object, such as table 2021. This single storage system instantiated table can include e.g. a table for storing registration data, e.g., name, address, social medial account data, user configuration data, permissions data, and the like. Such a table for storing registration data can be regarded to be an enrollment table.

Referring now to FIG. 2B, FIG. 2B illustrates a state of respective schema associated to user A and user B at a time after time $t=t_0$, namely time $t=t_0+1$.

Database management process 1702 can be configured so that respective data structure objects defining data structure objects of set of shared data structure objects 2201 instantiated in storage system 240 can be assigned name values that specify a logical order of the data structure object, e.g., table in a set of tables defining the data structure objects of set of shared data structure objects 220. Database management process 1702 can further be configured so that when database management process 1702 replicates a data structure object from set of shared data structure objects 2201 instantiated in storage system 240 for inclusion in a set of zero or more data structure objects of private data structure objects associated to a certain user, the replicated data structure object is assigned a common name value with the name value of the data structure object subject to replication from the data structure objects of set of shared data structure objects 2201 instantiated in storage system 240. Thus, every data structure object of set of shared data structure objects 2201 can include a name value, and every data structure object of set of private data structure objects 2202A and 2202B, whether logically assigned and uninstantiated or instantiated in storage system 240, can have a name value that maps to a name value of set of shared data structure objects 2201. Database management process 1702 can assign name values to data structure objects with use of a name value convention so that a shared object when replicated into a set of shared objects associated to a user retains a name value thereof, e.g., including in some instances a name value differentiated from a data structure object name value of the set of shared database objects by a suffix, prefix, or other metadata.

At time $t=t_0+1$ as depicted in FIG. 2B, both the first user, user A, and the second user, user B, have invoked database modification queries associated to one or more certain data structure object set of shared data structure objects 2201 instantiated in storage system 240. Referring to FIG. 2B, database management process 1702, as a result of user A invoking a database modification query associated to table 2011 of data structure objects of set of shared data structure objects 2201 instantiated in storage system 240, can replicate the 2011 so that the set of private data structure objects 2202B defining user A's schema includes the replicated table 2011 now instantiated into storage system 240. Database management process 1702 can assign the instance of table 2011 replicated into set of private data structure objects 2202A a table name value in common with the name value of the instance of table 2011 instantiated as part of set of shared data structure objects 2201. Further referring to FIG. 2B, the second user, user B, prior to time $t=t_0+1$ and after time $t=t_0$ has invoked a database modification query associated to table 2022 of set of shared data structure objects 2201 instantiated in storage system 240. As a result of the database modification query having been invoked, database management process 1702 can replicate the table 2022 of set of shared data structure objects 2201 instantiated in storage system 240 so that the set of private data structure objects 2202B associated to and defining the schema of user B now includes the replicated table 2022 instantiated in storage system 240. Referring to FIG. 2B, according to the scenario described, the schema of user A can include set of shared data structure objects 2201 instantiated in storage system 240 which, from the perspective of the first user, user A, now minus table 2011 and set of private data structure objects 2202A which now includes table 2011 instantiated in storage system 240.

At time $t=t_0+1$, the updated schema assigned to user B can now define access rights to data structure objects of shared data structure objects 2201 instantiated in storage system 240 which, from the perspective of user B, are now absent of table 2022 and the set of private data structure objects 2202B associated to user B's schema can include table 2021 which can be provided as an enrollment table and table 2022 replicated from set of shared data structure objects 2201. Embodiments herein will recognize that replicated table 2021 and replicated table 2022 instantiated as part of set of private data structure objects 2202B within storage system 240 can persist as part of set of shared data structure objects 2201 instantiated in storage system 240 that are shared amongst a plurality of users who use database 248 which users can include users other than user A and user B, e.g., user C through user Z.

Referring to FIG. 2C, FIG. 2C illustrates states of schema owned by user A and user B at time $t=t_0+2$. Between time $t=t_0+1$ and $t=t_0+2$, each of user A and user B may have invoked respective queries on database 248. However, whereas the database query invoked by user A was a modification query, the database operation invoked by user B was not a modification query, e.g., was only a read-only database operation such as a SELECT query in SQL. In such a situation referred to in FIG. 2C, database management process 1702 can dynamically adjust the schema for user A to a new state while maintaining the schema for user B in the state depicted as of time $t=t_0+1$. Between time $t=t_0+1$ and time $t=t_0+2$, user A in the described scenario has invoked the modification query associated to table 2012 of set of shared data structure objects 2201 instantiated in storage system 240.

As a result of the invoked modification query identified by database management process 1702, database management process 1702 can replicate table 2012 of set of shared data structure objects 2201 instantiated in storage system 240 so that the set of storage system instantiated private data structure objects 2202A associated to the schema for user A now includes third table 2012 instantiated in storage system 240 replicated from third table 2012 included within set of shared data structure objects 2201 instantiated in storage system 240. The set of storage system instantiated private data structure objects 2202B defining the private schema of user B are unchanged at the time $t=t_0+2$ relative to time $t=t_0+1$ due to the fact that the invoked query of user B was not a modification query.

Regarding the use case depicted in reference to FIG. 2A-2C, database management process 1702, for generation of a user A schema, assigns zero storage system instantiated private data structure objects instantiated in storage system 240 within set of private data structure objects 2202A on registration and enrollment for generation of a user B schema assigns one instantiated data structure object instantiated in storage system 240 within set of private data structure objects 2202B, namely table 2021, which can be an enrollment table, on registration of user B into system 100 as a registered user of database 248. The use case depicted in FIG. 2A-2C can occur and be employed, e.g., where the differentiation between schemas is useful for differentiating between rights associated to different classes of users of database 248. In another embodiment, database management process 1702, on registration of each user, can assign a schema for the respective user set of private data structure objects that includes zero storage system instantiated private data structure objects (an empty set) as depicted by set of instantiated data structure objects 2202A for user at time $t=t_0$. In another embodiment, database management process 1702, on registration and enrollment for each respective user, can generate a user schema for each user wherein the set of private data structure objects 2202A, 2202B for each respective user includes at least one storage system instantiated private data structure object instantiated in storage system 240.

In the embodiment of FIG. 2A-2C, database management process 1702 dynamically updates the user schema on a gradual data structure object by data structure object basis. According to the embodiment of FIG. 2A-2C, a user invoked database modification query associated to a certain data structure object of set of shared data structure objects 2201 instantiated in storage system 240 by a certain user can trigger replication of the certain shared data structure object set of shared data structure objects 2201 instantiated in storage system 240 to the certain user's private data structure object set 2202A, 2202B as an instantiated data structure object instantiated in storage system 240.

Figure 3A:
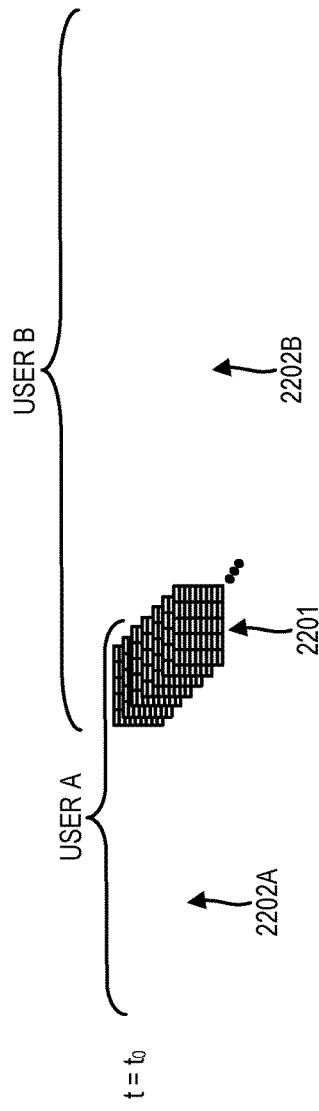
FIGS. 3A-3C are diagrams depicting assignments and updates of schema according to one embodiment.
Figure 3B:
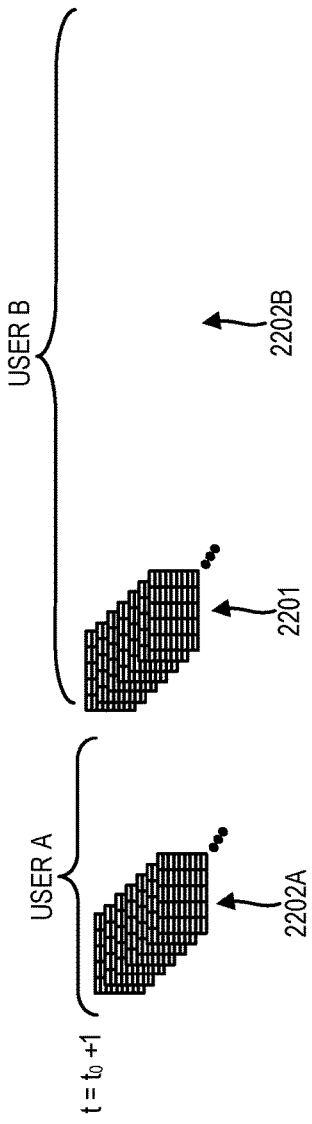
Figure 3C:
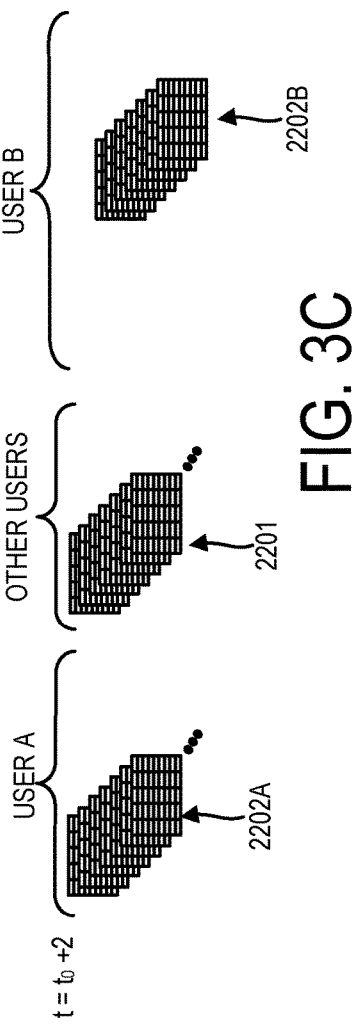

In the embodiment of FIG. 3A-3C, a user invoked database modification query associated to a certain data structure object of set of shared data structure objects 2201 can trigger replication of a plurality of data structure objects of shared data structure objects of set of shared data structure objects 2201 instantiated in storage system 240 into a set zero or more storage system instantiated private data structure objects of the user.

Referring to FIG. 3A, time $t=t_0$ can refer to a registration and enrollment time at which user A and user B register into system 100. At time $t_0$ in the embodiment of FIG. 3A, database management process 1702 can generate user schema for respective users A and B. The generated schema for the respective users can define access rights to data structure objects of set of shared data structure objects 2201 instantiated in storage system 240 and access rights to zero instantiated data structure objects of set of private data structure objects 2202A and 2202B (an empty set of uninstantiated private data structure objects is initially assigned in the embodiment of FIG. 3A-3B).

At time $t=t_0+1$ in the scenario depicted in FIG. 3B, each of user A and user B have invoked database queries of database 248 except that for user A the database query was a database modification query and for user B the database query was a read-only query. In the scenario described with reference to FIG. 3B, database management process 1702 at time $t=t_0+1$ has updated the schema for user A responsively to the database modification query invoked by user A associated to a certain data structure object so that set of private data structure objects 2202A for user A include a plurality of storage system instantiated data structure objects instantiated in storage system 240. For providing the plurality of data structure objects, database management process 1702 can replicate the plurality of data structure objects from set of shared data structure objects 2021 into set of private data structure objects 2202A as storage system instantiated data structure objects. In one embodiment, database management process 1702, in response to identifying a database modification query invoked by a certain user associated to a certain data structure object of set of shared data structure objects 2201 instantiated in storage system 240, can replicate all data structure objects of set of shared data structure objects 2201 into set of private data structure objects 2202A of user A as storage system instantiated data structure objects of set of private data structure objects 2202A instantiated in storage system 240.

At time $t=t_0+1$ depicted in FIG. 3B, the schema for user B remains in a state as depicted on registration at time $t=t_0$; that is, comprises data structure objects of set of shared data structure objects 2201 instantiated in storage system 240 and zero storage system instantiated data structure objects of set of private data structure objects 2202B indicating that for user B at time $t=t_0+1$, access to database 248 by user B is through set of shared data structure objects 2201 instantiated in storage system 240 provided new incoming queries are non-modification queries.

Further referring to the scenario depicted in FIG. 3A-3C, FIG. 3A-3C depicts the scenario wherein before time $t=t_0+2$ (FIG. 3C) and after time $t=t_0+1$ (FIG. 3B) user B has invoked a database modification query associated to a certain data structure object of set of shared data structure objects 2201 instantiated in storage system 240. In response to identification of the invoked modification query associated to a certain data structure object of set of shared data structure objects 2201 instantiated in storage system 240, database management process 1702 can update the user schema for user B as depicted in FIG. 3C.

In the scenario described with reference to FIG. 3C, database management process 1702 at time $t=t_0+2$ has updated the schema for user B responsively to the database modification query invoked by user B associated to a certain data structure object so that set of private data structure objects 2202B for user A includes a plurality of storage system instantiated data structure objects. For providing the plurality of data structure objects, database management process 1702 can replicate the plurality of data structure objects from set of shared data structure objects 2021 into set of private data structure objects 2202A as storage system instantiated data structure objects. In one embodiment, database management process 1702 in response to identifying a database modification query invoked by a certain user associated to a certain data structure object of set of shared data structure objects 2201 instantiated in storage system 240, can replicate all data structure objects of set of shared data structure objects 2201 into set of private data structure objects 2202B of user B. Any subsequent queries on database 248 invoked by user B can be performed on data structure objects of set of private data structure objects 2202B.

Referring further to FIG. 3C, the schema for other users, e.g., users of users C through Z, can continue to be defined by set of shared data structure objects 2201 instantiated in storage system 240 so that non-modification database queries invoked by users who have not previously invoked database modification queries will be performed on data structure objects of set of shared data structure objects 2201 instantiated in storage system 240. The embodiments of FIGS. 2A-3C can reduce reads on data structure objects of set of shared data structure objects 2201 instantiated in storage system 240 subsequent to an initial modification query associated to a shared database data structure object. Embodiments herein can reduce storage requirements for storing database data structure objects as well as processing requirements associated with replication of database data structure objects.

The embodiments of FIGS. 2A-3C can avoid reads on one or more data structure object of set of shared data structure objects 2201 instantiated in storage system 240 subsequent to an initial modification query associated to a shared database data structure object, thus providing isolation between users. Embodiments herein can reduce storage system storage requirements for storing database data structure objects and can also reduce processing requirements associated with replication of database data structure objects.

A method for performance by application 270 interoperating with database 248, UE device 120A, and UE device 120B is described in connection with the flowchart of FIG. 4. At block 1201, UE device 120A can be sending registration data for receipt by application 270 registration data can be user-defined registration data defined by a user who is using UE device 120A. The registration data can be registration data specifying a request by the UE device 120A to become a registered customer user of the service provided by application 270. Registration data can include, e.g., contact information specifying contacts of a user, e.g., name, address, social media account data, and the like, permissions data, and preferences data. In response to the receipt of registration data sent at block 1201, application 270 at block 2701 can generate the schema for user A of user UE device 120A.

The generated schema can define the user's access rights to data of database 248. As described in connection with FIG. 2A-3C, generated schema for a user on registration and enrollment can include a set of shared data structure objects defined by a set of storage system instantiated shared data structure objects and a set of private data structure objects that comprises zero or more storage system instantiated private data structure objects.

In response to the receipt of registration data sent at block 1201, application 270, by database management process 1702 at block 2701, can generate a schema that defines data structure object access rights of the user A using UE device 120A. Generated schema for the user A using UE device 120A generated at block 2701 can include data structure objects of set of shared data structure objects 2201 instantiated in storage system 240 and set of private data structure objects 2202A, 2202B as described in connection with FIG. 2A-3C which comprises registration and enrollment of zero or more storage system instantiated data structure objects.

Data structure objects of set of shared data structure objects 2201 instantiated in storage system 240 can be made accessible to other users of database 248 through respective schemas assigned to those other users by database management process 1702. Storage system instantiated private data structure objects of set of private data structure objects 2202A, 2202B instantiated in storage system 240 can be made accessible only to the single user to which a generated schema is associated.

Application 270 at block 2702 can send data specifying the generated schema generated at block 2701 to data dictionary 1482 of database 248, which data dictionary can be updated at block 2481.

At block 1211, UE device 120B can send registration data for receipt by application 270. The registration data sent at block 1211 can be user defined registration data defined by user B using UE device 120B.

In response to receipt of registration data from user B, application 270 by database management process 1702 can generate the user schema for the user B using UE device 120B. Generated schema generated on enrollment and registration of user B as a registered user of system 100 and database 248 can include data structure objects of set of shared data structure objects 2201 instantiated in storage system 240 and set of private data structure objects 2202B as described in connection with FIG. 2A-3C. The combination of storage system instantiated shared data structure objects and zero or more storage system instantiated private data structure objects define the user ownership and access rights in database 248. The set of shared data structure objects 2201 instantiated in storage system 240 can be accessible by other users of database 248. Any storage system instantiated data structure objects of the set of private data structure objects defining a user schema, according to one embodiment, cannot be accessed by other users of database 248 and can be accessed only by user B of the UE device 120B.

According to one embodiment, in response to the generate schema block 2703, application 270 can proceed to block 2704. At block 2704, application 270 can send data to data dictionary 1482 of database 248 specifying the new schema generated for user B at block 2703. Database 248 can responsively update data dictionary 1482 at block 2482.

After registration, user A of UE device 120A and user B of UE device 120B as well as other users can be engaged in sessions in which the users use database 248. The users of respective UE devices 120A-120Z can invoke queries on database 248. For invoking a query, the user of the UE device can send user defined data and application 270 can responsively identify a user invoked database query. User invoked database queries can include modification database queries (DELETE, CHANGE) and non-modification, e.g., read-only queries (SELECT, READ). A user invoked query on database 248 can be a modification query which modifies data of the database 248 or alternatively can be a non-modification query on database 248, which does not result in data of a data structure object being modified. Examples of modification queries can include DELETE, CHANGE. Examples of non-modification queries can include SELECT for read only operations in SQL. System 100 can be configured so that database management process 1702 can dynamically update a certain user schema associated to a certain user during the course of deployment of database 248. For updating the certain user schema, database management process 1702 can dynamically replicate one or more data structure object within set of shared data structure objects 2201 instantiated in storage system 240 for inclusion as one more storage system instantiated data structure object of a set of private data structure objects of the user.

For dynamically updating a user schema during the course of deployment of database 248, database management process 1702, in response to a condition being satisfied, can dynamically increase a number of storage system instantiated data structure objects within set of private data structure objects of a user schema instantiated in storage system 240. For increasing a number of storage system instantiated private data structure objects within set of private data structure objects of a user schema, database management process 1702 can replicate a data structure object from set of shared data structure objects 2201 instantiated in storage system 240 for inclusion in storage system instantiated private data structure objects included in set of private data structure objects of the user schema. The condition triggering a schema update can be the condition that the user has invoked a modification query associated to data structure object of set of shared data structure objects 2201 having a name value currently absent from storage system instantiated data structure objects of the user's set of private data structure objects.

Figure 4:
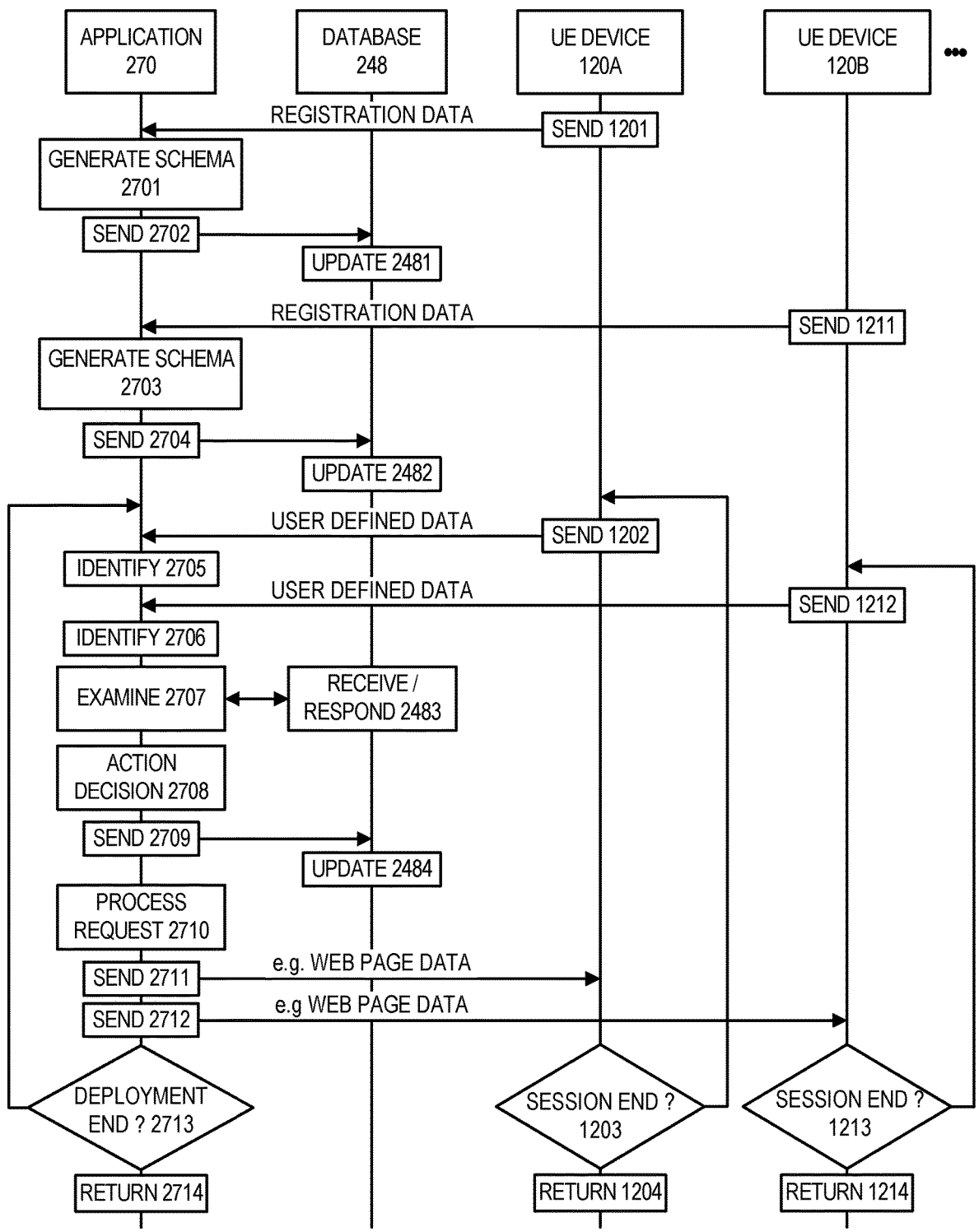
FIG. 4 is a flowchart illustrating a method for performance by an application interoperating with a database and user equipment devices according to one embodiment.

In reference to the flowchart of FIG. 4, UE device 120A and UE device 120B can be engaged in user sessions at block 1202 and 1212. At block 1202, UE device 120A can be sending user defined data to application 270. In response to the user defined data, application 270, by database management process 1702, can identify the database query at block 2705. The database query can be modification query, such as a DELETE query, or the database query can be a non-modification query, such as a READ query. Further, the query can be associated to certain data structure object such as a certain table. The query can be associated to a table having a certain table name value according to one embodiment.

With reference to FIG. 2A-3C, tables that are replicated from set of shared data structure objects 2201 instantiated in storage system 240 to set of private data structure objects of respective users of database 248 can retain their table name values when they are replicated. Referring further to the flowchart of FIG. 4, UE device 120B at block 1212 can be sending user defined data to application 270 to invoke a database query. In response to the user defined data received by application 270, application 270 by database management process 1702 can identify the query at block 2706. As with the query generated at block 2705, the query can be, e.g., a modification query or a non-modification query. The query can be associated to a table name value which can be identified by application 270.

Database management process 1702 can be configured so that respective tables of set of shared data structure objects 2201 instantiated in storage system 240 can be assigned name values that specify a logical order of the table in a set of tables defining the data structure objects of set of shared data structure objects 220. Database management process 1702 can further be configured so that when database management process 1702 replicates a table from set of shared data structure objects 2201 instantiated in storage system 240 for inclusion as a storage system instantiated data structure objects of set of private data structure objects associated to a certain user, the replicated data structure object is assigned a common name value with the name value of the table subject to replication from the data structure objects of set of shared data structure objects 2201. Thus, every table of set of shared data structure objects 2201 instantiated in storage system 240 can include a name value, and every data structure object of set of private data structure objects 2202A and 2202B, whether instantiated in storage system 240 or uninstantiated in storage system 240, can map to a name value of set of shared data structure objects 2201 instantiated in storage system 240.

In response to completion of block 2706, application 270 can proceed to examination block 2707 to examine any incoming identified queries such as the identified queries identified at blocks 2705 and 2706. At examination block 2707 and action decision block 2708, application 270 can determine whether to update a schema for a user.

For performance of examining block 2707, database management process 1702 using a control data structure as is shown in Table A.

TABLE A

| Tenant user Account ID | Data structure object Name Value | Shared/Private Status |
|---|---|---|
| U001 | D001 | Shared |
| U001 | D002 | Shared |
| U001 | D003 | Private |
| U001 | D004 | Shared |
| ... | ... | ... |
| U002 | D001 | Private |
| U002 | D002 | Shared |
| ... | ... | ... |

Referring to Table A, the control data structure of Table A can include three columns: a user identifier column, a data structure object order identifier column, and a shared/private status column. The user identifier column specifies the user identifier for users of database 248, the data structure object order identifier column specifies a data structure object order identifier, and the shared/private status column specifies a current status of a data structure object identified by the data structure object identifier. The status of status=shared can indicate that for a given user's schema, the named data structure object is included within set of shared data structure objects 2201. The status of private can indicate that for the given user's schema, the named data structure object is a storage system instantiated data structure object included within set of private data structure objects for the given user.

At "generate schema" blocks 2701 and 2703, database management process 1702, on registration of a new user to database 248, can initialize new rows for the user in the control data structure of Table A in accordance with the assigned schema for the user. The initial row value for Table A for a user can specify the controls described herein for the $t=t_0$ (on registration and enrollment), as set forth in connection with the examples of FIGS. 2A and 3A. There can be zero initial listed storage system instantiated private data structure objects for user A in the data structure object relational mapping decision data structure of Table A on registration and enrollment in the case of user A described with reference to FIG. 2A. There can be one initial listed storage system instantiated private data structure objects for user B in the control data structure of Table A on registration and enrollment in the case of user B described with reference to FIG. 2A. There can be zero initial listed storage system instantiated private data structure objects for user A in the control data structure of Table A on registration and enrollment in the case of user A described with reference to FIG. 3A. There can be zero initial listed storage system instantiated private data structure objects for user B in the control data structure of Table A on registration and enrollment in the case of user B described with reference to FIG. 3A.

For performance of examination block 2707, database management process 1702 can with the identification of a database query ascertain the user identifier type and data structure object name value of the query, and can look up the status of the data structure object name value from the control data structure of Table A. Based on the current status of the data structure object name value being status=shared and the query type being a modification query type, application 270 can update the schema of the user.

According to one embodiment, system 100 can be configured so that database management process 1702 updates the currency schema for a certain user in response to the determination that an invoked query invoked by the certain user is a modification query and further in response to the determination by the examination of the control data structure of Table A that the invoked query invoked by the user is associated to a data structure object having a data structure object order with a current shared/private status as status=shared.

Based on the described configuration, system 100 can update the schema for a user for increased isolation on the detecting that a user has invoked a modification query involving modification of data within the database data structure object of database 248. The described design iteratively evolves for increased isolation and security in dependence on a user's use of the database.

According to one embodiment, system 100 can be configured so that database management process 1702 updates schema for a certain user in response to the determination that an invoked query invoked by the certain user is a modification query and that the invoked query invoked by the user is associated to a data structure object having a data structure object name value having a current status of status=shared. System 100 can update a user's schema for increased isolation on the detecting that a user has invoked a query involving modification of data within the database data structure object of database 248. The described design iteratively evolves for increased isolation and security in dependence on user's use of the database.

On completion of block 2707, database management process 1702 can proceed to block 2708. At block 2708, database management process 1702 can return an action decision based on the examining performed at block 2707. The returned action decision returned at block 2708 can include updating the user schema in the case that (a) the user has invoked a query that is a modification query and (b) the invoked modification query is associated to a data structure object name value having a current status of status=shared in the shared/private status column of the control data structure of Table A.

At action decision block 2708, database management process 1702 can update both the schemas of user A and user B in the case that (a) the queries generated at block 2705 and 2706 that were invoked by user A and user B, respectively, were modification database queries and (b) the data structure object having a data structure object name value associated to the queries were determined to have a status=shared based on lookup using the control data structure of Table A.

For updating a schema of user A and user B, database management process 1702 can replicate a storage system instantiated data structure object, e.g. a table from set of shared data structure objects 2201 associated to an identified modification query into a set of private data structure objects 2202A, 2202B as a storage system instantiated table within a set of private data structure objects 2202A, 2202B instantiated in storage system 240 and can update the control data structure of Table A so that the shared/private status of the shared/private status column associated to the replicated data structure object is changed from status=shared to status=private.

So that the control data structure of Table A reflects the change status determined at block 2708, database management process 1702 can, at block 2709, send update data to data dictionary 1482 of database 248 so that schema data for users whose schema has been updated is appropriately changed. Database 248 can responsively update data dictionary 1482 at block 2484. According to one embodiment, an instance of the control data structure of Table A which specifies data of respective schema of various users can be stored in data dictionary 1482.

In response to completion of block 2709, database management process 1702 can proceed to block 2710. At block 2710, application 270 by database management process 1702 processes queries identified at block 2705 and 2706 so that a database action specified by the query is taken. For processing a query to perform an action of the query, database management process 1702 can examine the shared/private status column of the control data structure of Table A to determine a current storage system location of a data structure object having a certain data structure object name value associated to the query. Where the shared/private status of the certain data structure object name value is status=shared, the data structure object associated to a query being processed is an instantiated data structure object of set of shared data structure objects 2201 instantiated in storage system 240. Where the shared/private status of the certain data structure object name value is status=private the data structure object associated to a query being processed is an instantiated data structure object of set of private data structure objects 2202A or 2202B instantiated in storage system 240 associated to the user invoking the query.

For processing of a query invoked by a user, database management process 1702 can use the control data structure of Table A to determine the data structure object status (shared or private) for performing the action of the received query. In the case that the control data structure of Table A specifies that a data structure object name value associated to query has the status of status=shared, database management process 1702 can perform the action of the query using a table data structure object within set of shared data structure objects 2201 instantiated in storage system 240. In the case that the control data structure of Table A specifies that a data structure object name value associated to a query has the status of status=private, database management process 1702 can perform the action of the query using a storage system instantiated table data structure object within set of private data structure objects 2202A or 2202B instantiated in storage system 240.

Processing of the database query invoked by a user can involve providing responsive feedback to user, e.g., in the form of user interface visualization as determined by specific attributes of services process 1703 run by application 270. Accordingly, in some embodiments, application 270 at blocks 2711 and/or 2712 can send responsive webpage data for presentment, respectively, on a display of UE device 120A and/or UE device 120B. The responsive webpage data can include data values obtained from database 248 and/or data generated in dependence on such data values.

At block 2713, application 270 can determine whether a deployment period for database 248 has expired. If database 248 is still deployed, application 270 can return to a processing stage prior to block 2705 to iteratively identify and process the new queries invoked by users of database 248, such as users respectively associated UE devices 120A-120Z.

It can be seen that during the course of deployment of database 248, database management process 1702 can dynamically update schemas associated to various users of the database 248. For example, according to the described features, database management process 1702 can dynamically update schemas for active users of the database 248, i.e., those who actively modify data within data structure objects by way of invoking modification queries. Active users can have assigned thereto updated schemas having associated newly replicated table data structure objects replicated from set of shared data structure objects to define storage system instantiated private tables of the users not accessible by other users and highly isolated from other users for increased security. Database management process 1702 can avoid updating schemas and extending instantiated objects of a set of private data structure objects for inactive users, i.e., those that do not invoke modification database queries on database 248 after registration. Accordingly, database management process 1702 can update schema to extend a set of storage system instantiated private data structure objects defining the schema selectively for active users.

At return block 2714, application 270 can wait for redeployment of database 248, such as by way of deployment of the next instance of database 248. UE devices 120A, 120B (as well as other users) can iteratively perform sending as indicated by send block 1202 and send block 1212 in order to invoke new queries on database 248 for the time that a session of UE device and the user associated to it is active (decision blocks 1203 and 1213). On closing of a session, UE device 120A at return block 1204 and UE device 120B at return block 1214 can return to a stage prior to block 1202 or 1212 in order to wait for a new session of UE device 120B to be initiated by its user.

Figure 5A:
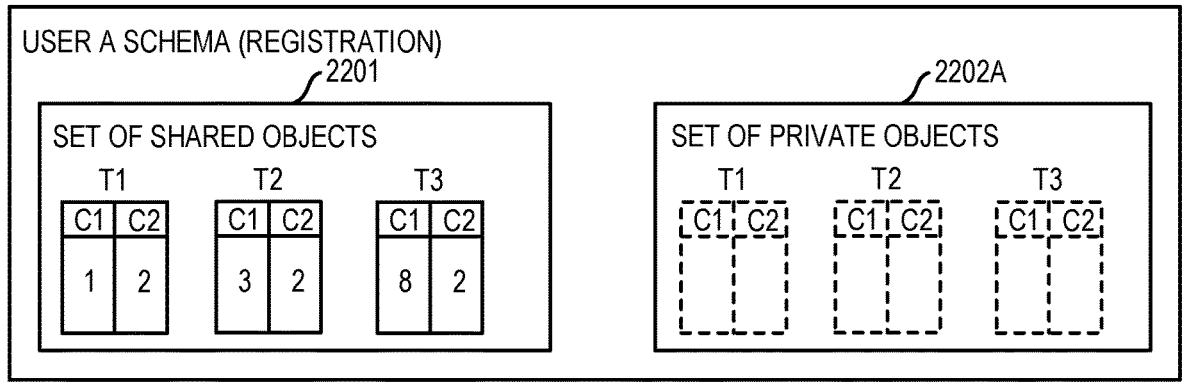
FIGS. 5A-5C are diagrams depicting assignments and updates of schema according to various embodiments.
Figure 5B:
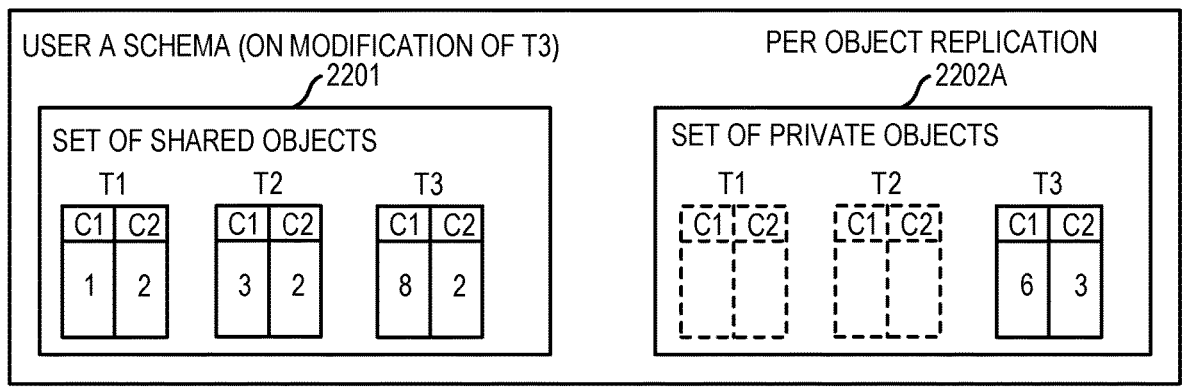
Figure 5C:
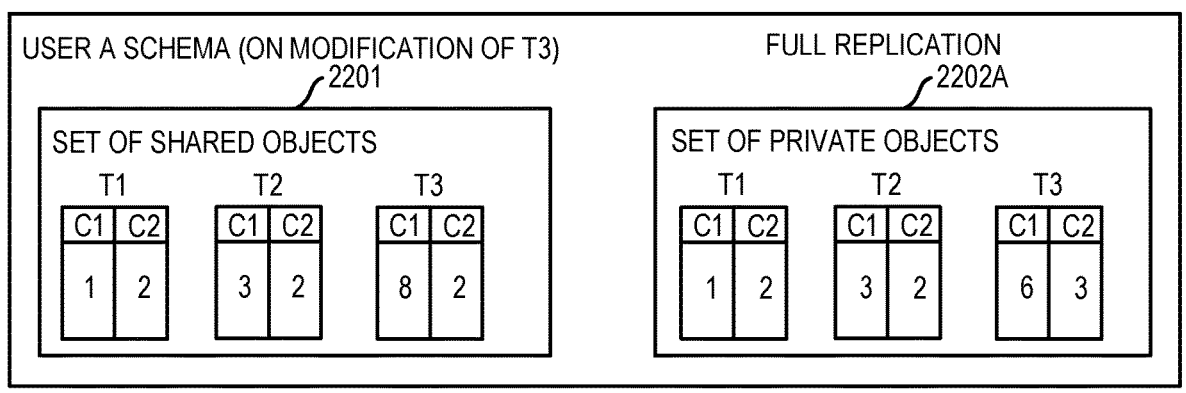

Further description of features herein is provided in reference to FIGS. 5A-5C. On user registration and account formation for user A, database management process 1702 can assign to user A the schema as shown in FIG. 5A. The schema for user A can include set of shared data structure objects 2201 instantiated in storage system 240 shared by other users and set of private data structure objects 2202A. The set of private data structure objects 2202A on registration can include logically assigned private data structure objects which have not been instantiated in storage system 240 but which are logically assigned by way of database management process 1702 being configured to be capable of creating the data structure objects in storage system 240 in response to satisfaction of a condition. In the state depicted in FIG. 5A, set of shared data structure objects 2201 instantiated in storage system 240 can include tables T1, T2, T3, and set of private data structure objects 2202B can include logically assigned tables T1, T2, and T3 which have not been instantiated in storage system 240 but which have the capacity to be instantiated in storage system 240. Tables T1, T2, and T3 of set of private data structure objects 2202B in the uninstantiated state depicted in FIG. 5A can be regarded to be empty tables. The respective name values of tables T1, T2, T3 of set of private data structure objects 2202A can map to the respective name values of storage system instantiated tables T1, T2, T3 of set of shared data structure objects 2201 instantiated in storage system 240.

In this case depicted in FIG. 5A, application 270 by database management process 1702 can assign set of private data structure objects 2202A based on set of shared data structure objects 2201 instantiated in storage system 240 but with empty tables that are not instantiated in storage system 240. For user read-only actions (SELECT query, listing some data), set of shared data structure objects 2201 instantiated in storage system 240 can be used. When it comes to data modification, application 270 can instantiate in storage system 240 and fill in just those tables that the user wants to modify on a per data structure object basis as depicted in FIGS. 2A-2C and FIG. 5B or on the identification of a first modification query can instantiate in storage system 240 and fill in multiple, e.g., all the empty tables in the set of private data structure objects 2202A, with data from the set of shared data structure objects (lazy approach), as depicted in FIGS. 3A-3C and FIG. 5C.

According to one embodiment, one or more object of set of shared data structure objects 2201 can be configured as an immutable read only table. An example of a read only table is a "roles" table with a predefined set of permissions for users. By configuration of set of shared data structure objects 2201 so that a certain object is immutable, the certain object from the perspective the user schema of all users of database 248 will remain part of set of shared data structure objects 2201 through the registration and enrollment period of each respective user and the deployment period of database 248. Selectively configuring one or more shared object as an immutable shared object conserves computing resources by restricting object replication. In an embodiment of the "lazy approach" described herein wherein a first modification query invoked by a certain user results in multiple data structure objects from set of shared data structure objects 2201 being replicated for storage system instantiation into a set of private data structure objects, database management process 1702, in response to identification of user invoked modification query modified by a certain user, can replicate all objects from set of shared data structure objects 2201 for storage system instantiation into a set of private data structure objects of the user, except for the one or more immutable shared object.

Embodiments herein recognize that applications are commonly designed to be used by multiple users at the same time. In many cases, such multi-tenant products store their data in relational databases using schema based multi-tenancy architecture. Embodiments herein recognize that when a user signs up, for example, at a social media website, a schema with many table data structure objects can be instantiated. Embodiments herein recognize that, in addition to users actively using the service and constantly modifying their data, there are users that just instantiate their account and stop using the website. As a result, the product database can contain schema table data structure objects that are filled with the same initial default for every user.

According to one embodiment, database 248 can be provided by a relational database. Where database 248 is provided by a relational database, queries identified at block 2705 and block 2706 by application 270 by database management process 1702 can be relational database queries, e.g., SQL queries. According to one embodiment, database 248 can be provided by object relational database (ORD). An ORD can include certain features associated to a relational database and certain features associated to an object oriented database. An object relational database (ORD) can feature object-relational mapping (ORM). ORM can provide for converting data between incompatible type systems using object-oriented programming languages. Database 248 can include ORM caching features to increase performance through localized data access. ORM caching features can include object oriented object caching features and data caching features.

Where database 248 is provided by an object relational database (ORD) that uses object relational mapping (ORM), queries identified by database management process 1702 at block 2705 and block 2706 can include user invoked object oriented language queries as well as user invoked relational database queries that are generated based on the object oriented language queries. Object oriented language queries can include, e.g., object query language (OQL) queries. Relational database queries can include, e.g., SQL queries. With use of ORM, database management process 1702 can generate data definition language (DDL) statements to define user invoked relational database queries, e.g., SQL queries, in dependence on the object oriented language queries. At examine block 2707, application 270 by database management process 1702 can be examining the generated relational database, e.g., SQL, queries. The examining of generated relational database queries can include examining of the relational database queries for ascertaining of a database structure object associated to a query, and query type (e.g., modification query, non-modification query). With use of ORM, relational database queries can be generated based on object oriented language queries. At examine block 2707, application 270 can be making multiple queries of control tables, e.g., including the decision data structure of Table A as indicated by receive and respond block 2483.

There is set forth herein running an application 270 on one or more computing node, the application providing user access to a database 248; receiving, by the application, registration data from a user for registering the user into a service; in response to the receiving the registration data from the user, generating a user schema that defines access rights of the user to the database, wherein the generated user schema includes a set of shared data structure objects instantiated in a storage system associated to the application, and a set of private data structure objects; determining that a query invoked by the user on the database 248 is a query for modification of certain data structure object that has a current status of shared according to the user's schema; and in response to the determining that the query invoked by the user on the database 248 is a query for modification of a certain data structure object that has a current status of shared according to the user's schema, updating the user's schema, wherein the updating the user's schema includes replicating the certain data structure object from the set of shared data structure objects into the set of private data structure objects so that the certain data structure object is provided as a storage system instantiated data structure object of the set of private data structure objects.

There is further set forth herein, according to one embodiment, a method wherein the database 248 is configured as an ORD having a relational database, and wherein the determining that the query invoked by the user on the database is a query for modification of the certain data structure object that has a current status of shared according to the user's schema, includes identifying an object oriented language query, generating a relational database query in dependence on the object oriented language query, and examining the generated relational database query for a reference to the certain data structure object.

According to one example, the Ruby On Rails (Active Record) platform can support handing of an object oriented language query as set forth in Table B.

TABLE B

| Object oriented language query handling |
|---|
| item = Item.new<br>item.name = "Some name" |

By way of ORM binding object oriented objects to data structure objects of database 248, the object oriented language query of Table B can generate a DDL statement to define a relational database query to result in creation of a new row in a name='items' table within database 248 with the value "Some name" set in the 'name' column of the new row.

With use of an ORD, object oriented objects can be provided for storage of data of users. Classes can provide definitions (written using object orient programming language) for the data and object oriented objects can provide instances of the classes. Classes can include e.g. procedures and variables. A User class using object oriented Java programming language can be provided as shown in Table C.

TABLE C

User class

```
public class User {
    String birthdate;
}
```

When a certain user (end user) registers to create an account, database management process 1702 can create for the certain user a User data structure object, i.e., one instance of the User class, in order to hold data of the real user. For storage of the user data into relational database data structure objects, e.g., tables, application 270 by database management process 1702 can persist the user data using ORM. ORM can map the described User class to a table or tables inside the database 248. ORM can automatically persist a user object oriented object to the data structure objects, e.g., tables, in database 248. According to one embodiment, ORM can be implemented using Java Persistence API (JPA). In order to implement ORM using JPA, developers can add special annotations to mark their classes so that ORM knows that a certain object oriented object is to be persisted. With use of appropriate annotations, an ORM framework like JPA can automatically provide data definition language (DDL) statements to define relational database queries, e.g., in SQL language for execution on database 248 in order to create tables, insert data, etc.

The @Multitenant annotation of JPA can be used to mark certain classes so that the certain classes are mapped to objects of set of shared data structure objects 2201. The @Multitenant annotation of JPA can specify that a given entity is shared amongst multiple tenants of an application. The @Multitenant annotation can be employed to specify how data for these entities is to be stored on database 248 for each tenant. Multitenancy can be specified at the entity or mapped superclass level.

Presented below in Table D is an example of @Multitenant annotation usage according to one embodiment.

TABLE D

@Multitenant annotation usage

```
import java.io.Serializable;
import javax.persistence.*;
@Entity
@Multitenant
public class Item implements Serializable {
    private String name;
    public Item(String name) {
        this.name = name;
    }
    public void setName(String name) {
        this.name = name_1
    }
}
```

Referring to Table D, when the Item (String name) constructor or setName method are invoked (for example, when an application user instantiates some data to invoke an object-oriented query), application 270 by database management process 1702 can generate a DDL statement to define a relational database modification query to modify the table object of set of shared data structure objects 2201 having the name value of name='name_1' value. Using one of the described scenarios above (i.e., per object replication or multi-object replication), database management process 1702, in response to the modification query, can replicate the shared table object with the name value of name='name_1' into set of private data structure objects of the user for instantiation into storage system 240. Further actions (UPDATE, DELETE) will occur on the new private object in accordance with the updated schema.

As set forth in connection with FIGS. 2A-2C and 5B, schema updates can be performed on a per object basis, or on a multi-object basis as described in connection with FIGS. 3A-3C and FIG. 5C. In another aspect, set of shared data structure objects 2201 can be configured so that one or more object of set of shared data structure objects 2201 is immutable and is restricted from being subject to modification by a relational database, e.g., SQL, query. According to one embodiment, one or more object of set of shared data structure objects 2201 can be configured as an immutable read only table. An example of a read only table is a "roles" table with a predefined set of permissions for users. By configuration of set of shared data structure objects 2201 so that a certain object is immutable, the certain object from the perspective the user schema of all users of database 248 will remain part of set of shared data structure objects 2201 through the registration period of each respective user and the deployment period of database 248. Selectively configuring one or more shared object as an immutable shared object conserves computing resources by restricting object replication. According to one embodiment, the @Immutable annotation of JPA can be used for configuring objects of a set of shared objects 2201 as immutable shared objects.

Embodiments herein can dynamically increase a level of isolation defined by a user's schema in dependence on a user's use of database 248. For example, as a user invokes queries that modify data of database 248, database management process 1702 can replicate one or more storage system instantiated data structure object of set of shared data structure objects 2201 for storage system instantiation into set of private data structure objects of the user.

Configuring database 248 as an ORD that uses ORM can provide additional data security advantages. In an SQL injection attack, malicious SQL statements can be inserted into an entry field for execution, e.g., to return the database contents to the attacker. An attacker with an SQL injection attack can, e.g., tamper with existing data, change balances, void transactions, destroy the data, or make it otherwise unavailable. With ORM mapping, the set of SQL queries that can interact with a relational database can be restricted by the ORM framework, which ORM framework can translate object oriented language queries invoked by a user into SQL queries invoked by the user. With use of ORM mapping, user invoked SQL queries can be generated at an ORM framework layer rather than at an application layer accessible by an adversary user By the ORM framework functioning to restrict the set of SQL queries that can interact with a relational database table object, the ORM framework can prevent a user from launching an SQL injection attack. With SQL queries limited by the ORM framework, there is less burden on a system software developer to design and test execution code for prevention of SQL injections.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes. The computer implemented method also includes running an application on one or more computing node, the application providing user access to a database; receiving, by the application, registration data from a user for registering the user into a service; generating a user schema that defines access rights of the user to the database, where the user schema resulting from the generating includes a set of shared data structure objects instantiated in a storage system associated to the application and a set of private data structure objects; determining that a query invoked by the user on the database is a query for modification of certain data structure object that has a current status of shared according to the user schema; and in response to the determining that the query invoked by the user on the database is a query for modification of a certain data structure object that has a current status of shared according to the user schema, updating the user schema, where the updating the user schema includes replicating the certain data structure object from the set of shared data structure objects into the set of private data structure objects so that the certain data structure object is provided as a storage system instantiated data structure object of the set of private data structure objects. Other embodiments of this aspect include corresponding computer systems, apparatus, and computer programs recorded on one or more computer storage devices, each configured to perform the actions of the methods.

Implementations may include one or more of the following features. The computer implemented method where the updating the user schema in response to the determining includes replicating a plurality of instantiated data structure objects from the set of shared data structure objects into the set of private data structure objects so that the plurality of instantiated data structure objects are provided as a storage system instantiated data structure object of the set of private data structure objects. The updating the user schema in response to the determining includes replicating an entirety of storage system instantiated data structure objects from the set of shared data structure objects into the set of private data structure objects so that the entirety of storage system instantiated data structure objects are provided as a storage system instantiated data structure objects of the set of private data structure objects. The determining that a query invoked by the user on the database is a query for modification of certain data structure object that has a current status of shared according to the user schema includes using a decision data structure that associates data structure object name values and users to a status value that specifies whether access by the user to the data structure object is through a shared data structure object set or through a private data structure object set. The determining that a query invoked by the user on the database is a query for modification of certain data structure object that has a current status of shared according to the user schema includes using a decision data structure that associates data structure object name values and users to a status value that specifies whether access by the user to the data structure object is through a shared data structure object set or through a private data structure object set. The generating includes logically assigning the set of private data structure objects in response to the receiving, by the application, the registration data so that on registration of the user, the set of private data structure objects may include of a set of empty data structure objects that are not instantiated in a storage system associated to the application. The generating is performed in response to the receiving, by the application, the registration data. The updating the user schema includes in response to the determining replicating a plurality of storage system instantiated tables from the set of shared data structure objects so that the plurality of storage system instantiated tables are provided as storage system instantiated tables of the set of private data structure objects. The database is configured as an object relational database (ORD) having a relational database that uses object relational mapping (ORM) to bind object oriented objects to data structure objects of the relational database included in the database. The database is configured as an object relational database (ORD) having a relational database, and where the determining that the query invoked by the user on the database is a query for modification the certain data structure object that has a current status of shared according to the user schema, includes identifying an object oriented language query, generating a relational database query in dependence on the object oriented language query, and examining the generated relational database query for a reference to the certain data structure object. The database is configured as an object relational database (ORD) that uses object relational mapping (ORM) to bind object oriented objects to data structure objects of a relational database, and where an ORM framework of the ORD restricts a set of SQL queries that can interact with the relational database. The database is configured as an object relational database (ORD) that uses object relational mapping (ORM) to bind object oriented objects to data structure objects of a relational database, and where an ORM framework of the ORD restricts a set of SQL queries that can interact with the relational database. The method includes processing a user invoked query using a decision data structure that associates data structure object name values and users to a status value that specifies whether access by the user to the data structure object is through a shared data structure object set or through a private data structure object set, where the processing the user invoked query includes determining that the user invoked query is a non-modification query associated to a particular data structure object that has a current status of shared according to the user schema, and responsively reading data from the particular data structure object within the set of shared data structure objects. The set of shared data structure objects instantiated in the storage system includes at least one immutable shared data structure object that is restricted from being replicated into the set of private data structure objects as a storage system instantiated object. The set of shared data structure objects instantiated in the storage system includes at least one immutable shared data structure object that is restricted from being replicated into the set of private data structure objects as a storage system instantiated object, where the updating the user schema in response to the determining includes replicating a plurality of instantiated data structure objects other than the at least one immutable shared data structure object from the set of shared data structure objects into the set of private data structure objects so that the plurality of instantiated data structure objects are provided as a storage system instantiated data structure object of the set of private data structure objects. The method includes in response to the receiving the registration data from the user, generating the user schema that defines access rights of the user to the database so that the set of private data structure objects of the user schema on registration of the user includes zero storage system instantiated private data structure objects. The method includes in response to the receiving the registration data from the user, generating the user schema that defines access rights of the user to the database so that the set of private data structure objects of the user schema on registration of the user includes at least one storage system instantiated private data structure object, where the method includes, in response to receiving the registration data from a second user, generating a second user schema that defines access rights of the second user to the database, where the generated user schema of the second user includes a set of shared data structure objects instantiated in a storage system associated to the application, and a set of private data structure objects that may include at least one storage system instantiated private data structure object. The method includes in response to the receiving the registration data from the user, generating the user schema that defines access rights of the user to the database so that the set of private data structure objects of the user schema on registration of the user includes zero storage system instantiated private data structure object, where the method includes, in response to receiving the registration data from a second user, generating a second user schema that defines access rights of the second user to the database, where the generated user schema of the second user includes a set of shared data structure objects instantiated in a storage system associated to the application, and a set of private data structure objects that may include at least one storage system instantiated private data structure object. Implementations of the described techniques may include hardware, a method or process, or computer software on a computer-accessible medium.

One general aspect includes a computer readable storage medium readable by one or more processing circuit and storing instructions for execution by one or more processor for performing. The computer program product also includes running an application on one or more computing node, the application providing user access to a database; receiving by the application registration data from a user for registering the user into a service; in response to the receiving the registration data from the user, generating a user schema that defines access rights of the user to the database, where the generated user schema includes a set of shared data structure objects instantiated in a storage system associated to the application, and a set of private data structure objects; determining that a query invoked by the user on the database is a query for modification of certain data structure object that has a current status of shared according to the user's schema; and in response to the determining that the query invoked by the user on the database is a query for modification of a certain data structure object that has a current status of shared according to the user's schema, updating the user's schema, where the updating the user's schema includes replicating the certain data structure object from the set of shared data structure objects into the set of private data structure objects so that the certain data structure object is provided as a storage system instantiated data structure object of the set of private data structure objects. Other embodiments of this aspect include corresponding computer systems, apparatus, and computer programs recorded on one or more computer storage devices, each configured to perform the actions of the methods.

One general aspect includes a system including: a memory; at least one processor in communication with the memory; and program instructions executable by one or more processor via the memory to perform a method may include running an application on one or more computing node, the application providing user access to a database; receiving by the application registration data from a user for registering the user into a service; in response to the receiving the registration data from the user, generating a user schema that defines access rights of the user to the database, where the generated user schema includes a set of shared data structure objects instantiated in a storage system associated to the application, and a set of private data structure objects; determining that a query invoked by the user on the database is a query for modification of certain data structure object that has a current status of shared according to the user's schema; and in response to the determining that the query invoked by the user on the database is a query for modification of a certain data structure object that has a current status of shared according to the user's schema, updating the user's schema, where the updating the user's schema includes replicating the certain data structure object from the set of shared data structure objects into the set of private data structure objects so that the certain data structure object is provided as a storage system instantiated data structure object of the set of private data structure objects. Other embodiments of this aspect include corresponding computer systems, apparatus, and computer programs recorded on one or more computer storage devices, each configured to perform the actions of the methods.

Certain embodiments herein may offer various technical computing advantages involving computing advantages to address problems arising in the realm of computer networks. Embodiments herein can dynamically update a user schema during the course of deployment of a database. Embodiments herein, in response to a condition being satisfied, for increased isolation and data security, can dynamically increase a number of storage system instantiated data structure objects within a set of private data structure objects defining a user's schema. Embodiments herein can dynamically replicate one or more data structure object within a set of shared data structure objects instantiated in a storage system for instantiation of the one or more data structure objects into set of private data structure objects of the user. Embodiments herein recognize isolation advantages associated with a schema based multitenancy architecture as well as challenges associated with implementations of schema based multitenancy architectures. Embodiments herein recognize that implementations of schema based multitenancy architectures can result in excessive storage system instantiations of database data structure objects. Excessive data structure object instantiations can significantly consume processing and storage computing resources and predefined data structure object limits specified in a database software support package supporting a database can readily be violated. Embodiments herein can avoid excessive instantiations of data structure objects in a schema based multitenant architecture. Embodiments herein, in response to an invoked query invoked by a user satisfying a condition, can dynamically increase, for increased isolation and data security, a number of instantiated objects, e.g., tables within set of private data structure objects defining a user schema. With use of ORM, the set of relational database queries, e.g., SQL queries that can interact with a relational database can be restricted by the ORM framework, which ORM framework can translate object oriented language queries invoked by a user into SQL queries invoked by the user. With use of ORM mapping, SQL queries can be generated at an ORM framework layer rather than at an application layer accessible by an adversary user. By way of the ORM framework functioning to restrict the set of SQL queries that can interact with a relational database table object, the ORM framework can prevent a malicious user from launching an SQL injection attack.

Figure 6:
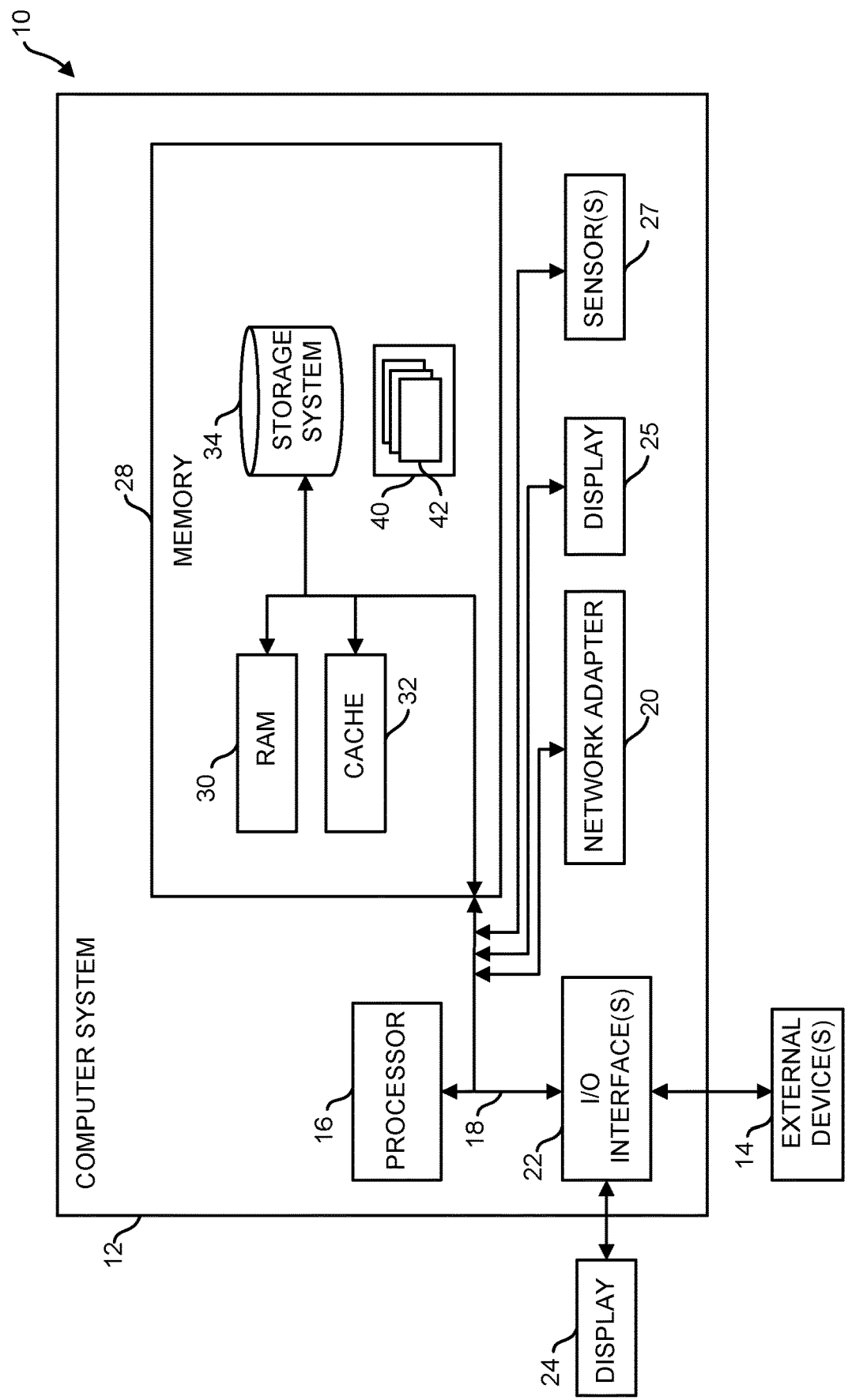
FIG. 6 depicts a computing node according to one embodiment.
Figure 7:
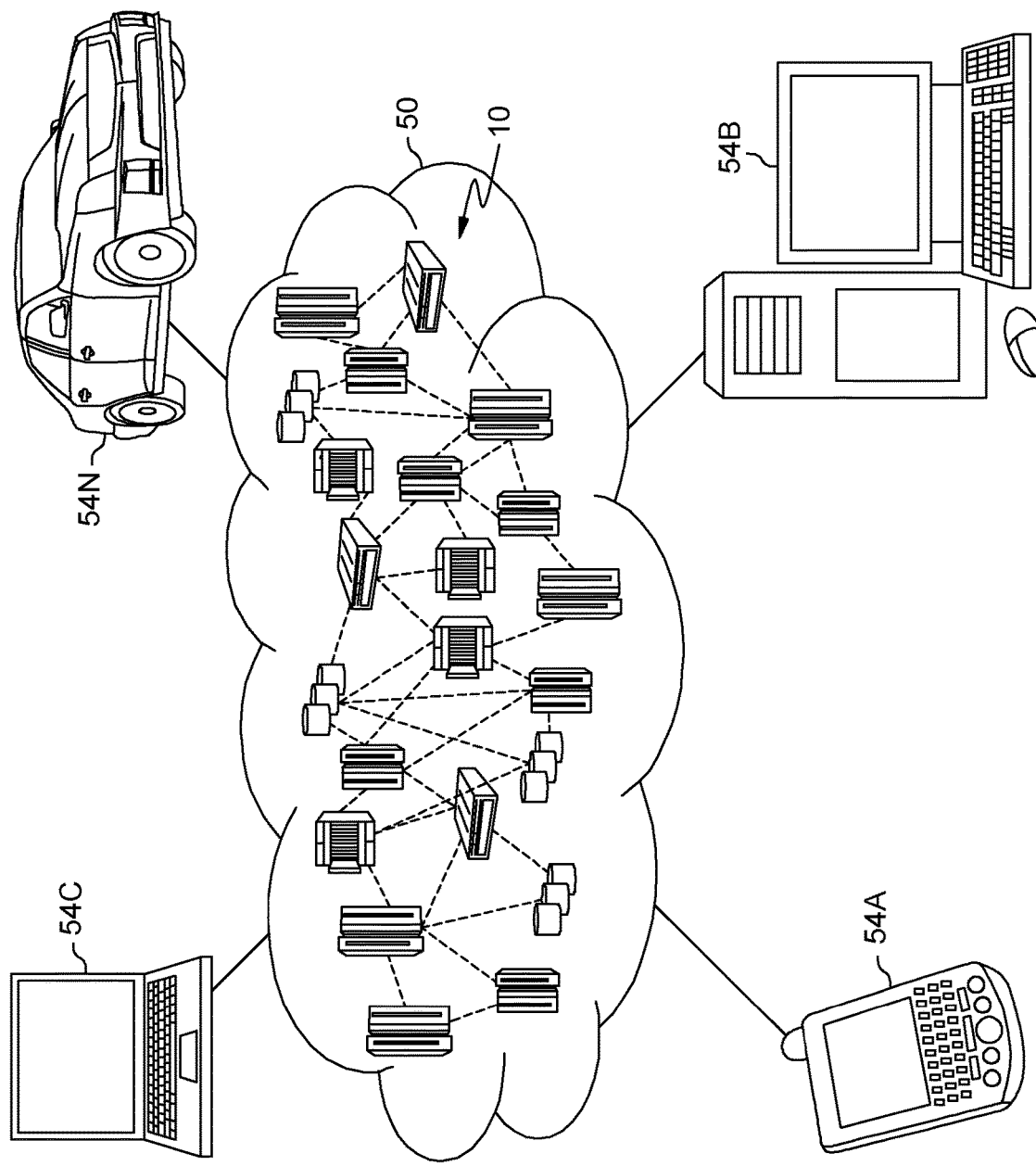
FIG. 7 depicts a cloud computing environment according to one embodiment.
Figure 8:
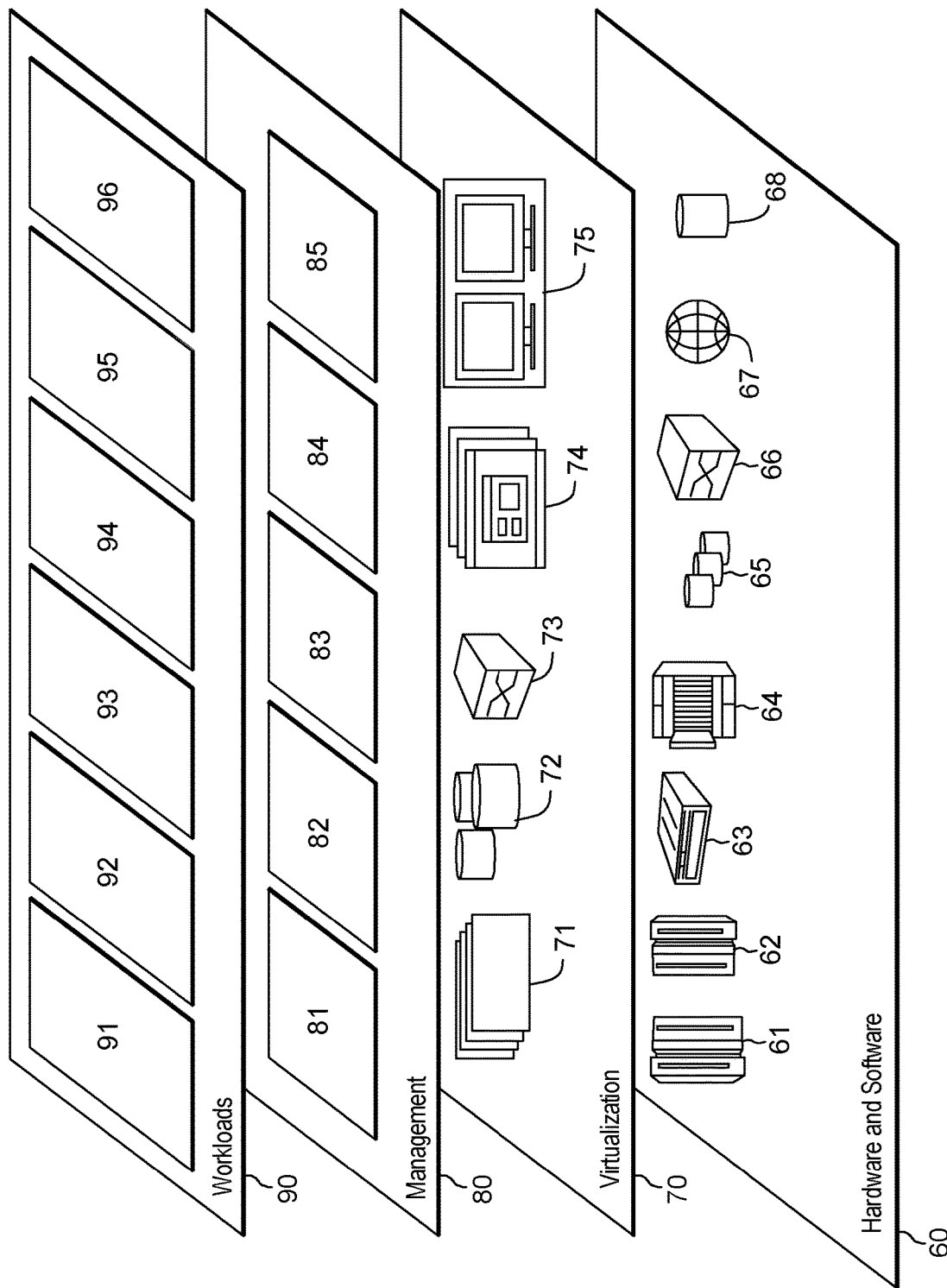
FIG. 8 depicts abstraction model layers according to one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, data structure objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with functions described with reference to application 270 as set forth in the flowchart of FIG. 4. In one embodiment, one or more user equipment device can include one or more computing node 10 and can include one or more program 40 for performing functions described with reference to one or more user equipment device 120A-120Z as set forth in the flowchart of FIG. 4. In one embodiment, the computing node based systems and devices depicted in FIG. 1 can include one or more program for performing functions described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 7 computing node 10 is described as being implemented in a cloud computing environment and accordingly is referred to as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating database schema as set forth herein. The processing components 96 can be implemented with use of one or more program 40 described in FIG. 6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or data structure object code written in any combination of one or more programming languages, including a data structure object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
generating a user schema that defines access rights of the user to a database, wherein the user schema resulting from the generating includes a set of shared data structure objects instantiated in a storage system associated to an application and a set of private data structure objects;
determining that a query invoked by the user on the database is a query for modification of a certain data structure object that has a current status of shared according to the user schema; and
in response to the determining that the query invoked by the user on the database is a query for modification of a certain data structure object that has a current status of shared according to the user schema, updating the user schema, wherein the updating the user schema includes replicating the certain data structure object from the set of shared data structure objects into the set of private data structure objects so that the certain data structure object is provided as a storage system instantiated data structure object of the set of private data structure objects, wherein the replicating is performed so that the certain data structure object remains as a storage system instantiated data structure object of the set of shared data structure objects.

2. The computer implemented method of claim 1, comprising:
running an application on one or more computing node, the application providing user access to the database; and
receiving, by the application, registration data from a user for registering the user into a service.

3. The computer implemented method of claim 2, wherein the generating is performed in response to the receiving, by the application, the registration data.

4. The computer implemented method of claim 2, wherein the computer implemented method is further characterized by one or more of the following selected from the group consisting of (a) the computer implemented method includes processing a user invoked query using a decision data structure that associates data structure object name values and users to a status value that specifies whether access by the user to a data structure object is through a shared data structure object set or through a private data structure object set, wherein the processing the user invoked query includes determining that the user invoked query is a non-modification query associated to a particular data structure object that has a current status of shared according to the user schema, and responsively reading data from the particular data structure object within the set of shared data structure objects, (b) the set of shared data structure objects instantiated in the storage system includes at least one immutable shared data structure object that is restricted from being replicated into the set of private data structure objects as a storage system instantiated object, wherein the updating the user schema in response to the determining includes replicating a plurality of instantiated data structure objects other than the at least one immutable shared data structure object from the set of shared data structure objects into the set of private data structure objects so that the plurality of instantiated data structure objects are provided as a storage system instantiated data structure object of the set of private data structure objects, (c) the computer implemented method includes in response to the receiving the registration data from the user, generating the user schema that defines access rights of the user to the database so that the set of private data structure objects of the user schema on registration of the user includes zero storage system instantiated private data structure objects, (d) the computer implemented method includes in response to the receiving the registration data from the user, generating the user schema that defines access rights of the user to the database so that the set of private data structure objects of the user schema on registration of the user includes at least one storage system instantiated private data structure object, wherein the computer implemented method includes, in response to receiving the registration data from a second user, generating a second user schema that defines access rights of the second user to the database, wherein the generated user schema of the second user includes a set of shared data structure objects instantiated in a storage system associated to the application, and a set of private data structure objects that comprises at least one storage system instantiated private data structure object, (e) the computer implemented method includes in response to the receiving the registration data from the user, generating the user schema that defines access rights of the user to the database so that the set of private data structure objects of the user schema on registration of the user includes zero storage system instantiated private data structure object, wherein the computer implemented method includes, in response to receiving the registration data from a second user, generating a second user schema that defines access rights of the second user to the database, wherein the generated user schema of the second user includes a set of shared data structure objects instantiated in the storage system associated to the application, and a set of private data structure objects that comprises at least one storage system instantiated private data structure object.

5. The computer implemented method of claim 2, wherein the replicating the certain data structure object from the set of shared data structure objects into the set of private data structure objects is performed so that the certain data structure object is provided as the storage system instantiated data structure object of the set of private data structure objects while remaining as the storage system instantiated data structure object of the set of shared data structure objects.

6. The computer implemented method of claim 2, wherein the updating the user schema in response to the determining includes replicating a plurality of instantiated data structure objects from the set of shared data structure objects into the set of private data structure objects so that the plurality of instantiated data structure objects are provided as the storage system instantiated data structure object of the set of private data structure objects, wherein the determining that the query invoked by the user on the database is the query for modification of the certain data structure object that has the current status of shared according to the user schema includes using a decision data structure that associates data structure object name values and users to a status value that specifies whether access by the user to the data structure object is through a shared data structure object set or through a private data structure object set, wherein the generating includes logically assigning the set of private data structure objects in response to the receiving, by the application, the registration data so that on registration of the user, the set of private data structure objects consists of a set of empty data structure objects that are not instantiated in the storage system associated to the application, wherein the set of shared data structure objects instantiated in the storage system includes at least one immutable shared data structure object that is restricted from being replicated into the set of private data structure objects as the storage system instantiated data structure object, wherein the updating the user schema in response to the determining includes replicating the plurality of instantiated data structure objects other than the at least one immutable shared data structure object from the set of shared data structure objects into the set of private data structure objects so that the plurality of instantiated data structure objects are provided as the storage system instantiated data structure object of the set of private data structure objects, wherein the computer implemented method includes in response to the receiving the registration data from the user, generating the user schema that defines access rights of the user to the database so that the set of private data structure objects of the user schema on registration of the user includes at least one storage system instantiated private data structure object, wherein the computer implemented method includes, in response to receiving the registration data from a second user, generating a second user schema that defines access rights of the second user to the database, wherein the generated user schema of the second user includes a set of shared data structure objects instantiated in the storage system associated to the application, and a set of private data structure objects that comprises at least one storage system instantiated private data structure object.

7. The computer implemented method of claim 2, wherein the updating the user schema in response to the determining includes replicating a plurality of instantiated data structure objects from the set of shared data structure objects into the set of private data structure objects so that the plurality of instantiated data structure objects are provided as the storage system instantiated data structure object of the set of private data structure objects, wherein the generating includes logically assigning the set of private data structure objects in response to the receiving, by the application, the registration data so that on registration of the user, the set of private data structure objects consists of a set of empty data structure objects that are not instantiated in the storage system associated to the application, wherein the set of shared data structure objects instantiated in the storage system includes at least one immutable shared data structure object that is restricted from being replicated into the set of private data structure objects as the storage system instantiated data structure object.

8. The computer implemented method of claim 2, wherein the updating the user schema in response to the determining includes replicating a plurality of instantiated data structure objects from the set of shared data structure objects into the set of private data structure objects so that the plurality of instantiated data structure objects are provided as the storage system instantiated data structure object of the set of private data structure objects, wherein the computer implemented method includes, in response to receiving the registration data from a second user, generating a second user schema that defines access rights of the second user to the database, wherein the generated user schema of the second user includes a set of shared data structure objects instantiated in the storage system associated to the application, and a set of private data structure objects that comprises at least one storage system instantiated private data structure object.

9. The computer implemented method of claim 2, wherein the computer implemented method includes in response to the receiving the registration data from the user, generating the user schema that defines access rights of the user to the database so that the set of private data structure objects of the user schema on registration of the user includes at least one storage system instantiated private data structure object, wherein the computer implemented method includes, in response to receiving the registration data from a second user, generating a second user schema that defines access rights of the second user to the database, wherein the generated user schema of the second user includes a set of shared data structure objects instantiated in the storage system associated to the application, and a set of private data structure objects that comprises at least one storage system instantiated private data structure object.

10. The computer implemented method of claim 1, wherein the updating the user schema in response to the determining includes replicating a plurality of instantiated data structure objects from the set of shared data structure objects into the set of private data structure objects so that the plurality of instantiated data structure objects are provided as a storage system instantiated data structure object of the set of private data structure objects.

11. The computer implemented method of claim 1, wherein the updating the user schema in response to the determining includes replicating an entirety of storage system instantiated data structure objects from the set of shared data structure objects into the set of private data structure objects so that the entirety of storage system instantiated data structure objects are provided as the storage system instantiated data structure objects of the set of private data structure objects.

12. The computer implemented method of claim 1, wherein the determining that the query invoked by the user on the database is a query for modification of a certain data structure object that has a current status of shared according to the user schema includes using a decision data structure that associates data structure object name values and users to a status value that specifies whether access by the user to the data structure object is through a shared data structure object set or through a private data structure object set.

13. The computer implemented method of claim 1, wherein the generating includes logically assigning the set of private data structure objects in response to receiving, by the application, registration data so that on registration of the user, the set of private data structure objects consists of a set of empty data structure objects that are not instantiated in a storage system associated to the application.

14. The computer implemented method of claim 1, wherein the updating the user schema includes, in response to the determining, replicating a plurality of storage system instantiated tables from the set of shared data structure objects so that a plurality of storage system instantiated tables are provided as storage system instantiated tables of the set of private data structure objects.

15. The computer implemented method of claim 1, wherein the database is configured as an object relational database (ORD) having a relational database, and wherein the determining that the query invoked by the user on the database is a query for modification of the certain data structure object that has a current status of shared according to the user schema, includes identifying an object oriented language query, generating a relational database query in dependence on the object oriented language query, and examining the generated relational database query for a reference to the certain data structure object.

16. The computer implemented method of claim 1, wherein the set of shared data structure objects instantiated in the storage system includes at least one immutable shared data structure object that is restricted from being replicated into the set of private data structure objects as a storage system instantiated object.

17. The computer implemented method of claim 1, wherein the replicating is performed so that the certain data structure object is provided as the storage system instantiated data structure object of the set of private data structure objects while remaining as the storage system instantiated data structure object of the set of shared data structure objects.

18. A system comprising:
   a memory;
   at least one processor in communication with the memory; and
   program instructions executable by one or more processor via the memory to perform a method comprising:
      generating a user schema that defines access rights of the user to a database, wherein the user schema resulting from the generating includes a set of shared data structure objects instantiated in a storage system associated to an application and a set of private data structure objects;
      determining that a query invoked by the user on the database is a query for modification of a certain data structure object that has a current status of shared according to the user schema; and in response to the determining that the query invoked by the user on the database is a query for modification of a certain data structure object that has a current status of shared according to the user schema, updating the user schema, wherein the updating the user schema includes replicating the certain data structure object from the set of shared data structure objects into the set of private data structure objects so that the certain data structure object is provided as a storage system instantiated data structure object of the set of private data structure objects, wherein the replicating is performed so that the certain data structure object remains as a storage system instantiated data structure object of the set of shared data structure objects.

19. The system of claim 18, wherein the replicating is performed so that the certain data structure object is provided as the storage system instantiated data structure object of the set of private data structure objects while remaining as the storage system instantiated data structure object of the set of shared data structure objects.

20. A computer program product comprising:
a computer readable storage medium readable by one or more processing circuit and storing instructions for execution by one or more processor for performing a method comprising:
generating a user schema that defines access rights of the user to a database, wherein the user schema resulting from the generating includes a set of shared data structure objects instantiated in a storage system associated to an application and a set of private data structure objects;
determining that a query invoked by the user on the database is a query for modification of a certain data structure object that has a current status of shared according to the user schema; and
in response to the determining that the query invoked by the user on the database is a query for modification of a certain data structure object that has a current status of shared according to the user schema, updating the user schema, wherein the updating the user schema includes replicating the certain data structure object from the set of shared data structure objects into the set of private data structure objects so that the certain data structure object is provided as a storage system instantiated data structure object of the set of private data structure objects, wherein the replicating is performed so that the certain data structure object remains as a storage system instantiated data structure object of the set of shared data structure objects.

* * * * *